(12) United States Patent
Roever et al.

(10) Patent No.: US 9,621,372 B2
(45) Date of Patent: Apr. 11, 2017

(54) TITLE-ENABLED NETWORKING

(75) Inventors: Stefan Roever, Los Altos Hills, CA (US); Karl Ginter, Beltsville, MD (US)

(73) Assignee: OnCircle, Inc., Santa Clara, CA (US)

(*) Notice: Subject to any disclaimer, the term of this patent is extended or adjusted under 35 U.S.C. 154(b) by 1434 days.

(21) Appl. No.: 11/741,952

(22) Filed: Apr. 30, 2007

(65) Prior Publication Data

US 2007/0286393 A1 Dec. 13, 2007

Related U.S. Application Data

(60) Provisional application No. 60/746,032, filed on Apr. 29, 2006.

(51) Int. Cl.
  G06F 15/16 (2006.01)
  H04L 12/28 (2006.01)
  H04L 29/06 (2006.01)

(52) U.S. Cl.
  CPC .......... H04L 12/2856 (2013.01); H04L 63/10 (2013.01)

(58) Field of Classification Search
  CPC .................. H04L 12/2856; H04L 63/10
  USPC ........................................................ 709/229
  See application file for complete search history.

(56) References Cited

U.S. PATENT DOCUMENTS

| | | | |
|---|---|---|---|
| 5,455,407 A | 10/1995 | Rosen | |
| 5,606,609 A | 2/1997 | Houser et al. | |
| 5,629,980 A | 5/1997 | Stefik | |
| 5,752,020 A | 5/1998 | Ando | |
| 5,778,182 A | 7/1998 | Cathey | |
| 5,794,217 A | 8/1998 | Allen | |
| 5,812,670 A | 9/1998 | Micali | |
| 5,892,900 A | 4/1999 | Ginter | |
| 5,903,880 A | 5/1999 | Biffar | |
| 5,905,976 A | 5/1999 | Mjolsnes et al. | |
| 5,941,947 A | 8/1999 | Brown et al. | |
| 5,956,736 A | 9/1999 | Hanson et al. | |
| 6,065,117 A | 5/2000 | White | |
| 6,098,056 A | 8/2000 | Rusnak et al. | |
| 6,119,229 A | 9/2000 | Martinez | |

(Continued)

FOREIGN PATENT DOCUMENTS

| | | |
|---|---|---|
| JP | 02-245970 | 1/1990 |
| JP | 2001338242 A | 12/2001 |

(Continued)

OTHER PUBLICATIONS

Office Action dated Jun. 24, 2009 from U.S. Appl. No. 10/232,861.

(Continued)

*Primary Examiner* — Ryan Jakovac
(74) *Attorney, Agent, or Firm* — Weaver Austin Villeneuve & Sampson LLP

(57) ABSTRACT

Methods and apparatus are provided for processing packets in a network. A received packet includes title materials which include one or more of a title object, a component of the title object, or a reference to the title object. The title object is a digital bearer instrument representing at least one right relating to processing of the packet in the network which may be redeemed by presentation of the title object to a title-enabled device or process operating in the network. Upon validation of the title object, the packet is processed in the network in accordance with the at least one right represented by the title object.

31 Claims, 14 Drawing Sheets

(56) References Cited

U.S. PATENT DOCUMENTS

Figure 1:
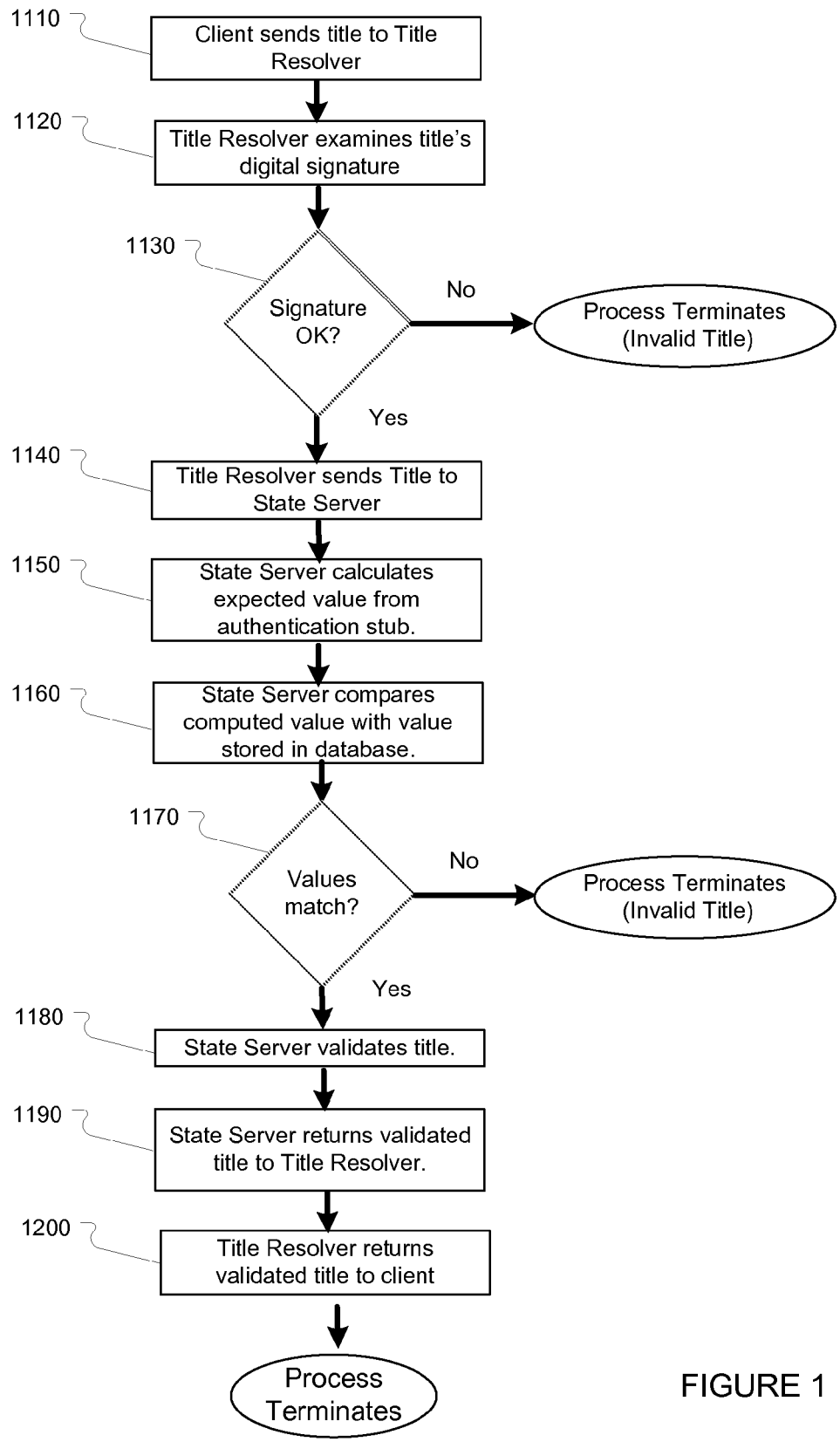

| | | | |
|---|---|---|---|
| 6,141,006 A | 10/2000 | Knowlton | |
| 6,154,214 A | 11/2000 | Uyehara | |
| 6,170,744 B1 | 1/2001 | Lee et al. | |
| 6,189,097 B1 | 2/2001 | Tycksen, Jr. | |
| 6,205,436 B1 | 3/2001 | Rosen et al. | |
| 6,212,504 B1 | 4/2001 | Hayosh | |
| 6,327,578 B1 | 12/2001 | Linehan | |
| 6,330,544 B1 | 12/2001 | Walker et al. | |
| 6,341,353 B1 | 1/2002 | Herman et al. | |
| 6,360,254 B1 | 3/2002 | Linden et al. | |
| 6,372,974 B1 | 4/2002 | Gross et al. | |
| 6,378,075 B1 | 4/2002 | Goldstein | |
| 6,389,541 B1 | 5/2002 | Patterson | |
| 6,519,573 B1 | 2/2003 | Shade et al. | |
| 6,574,609 B1 | 6/2003 | Downs | |
| 6,578,078 B1 | 6/2003 | Smith | |
| 6,587,867 B1 | 7/2003 | Miller et al. | |
| 6,591,260 B1 | 7/2003 | Schwarzhoff et al. | |
| 6,600,823 B1 | 7/2003 | Hayosh | |
| 6,629,081 B1 | 9/2003 | Cornelius | |
| 6,662,340 B2 | 12/2003 | Rawat | |
| 6,675,153 B1 | 1/2004 | Cook | |
| 6,751,670 B1 | 6/2004 | Patterson | |
| 6,772,341 B1 | 8/2004 | Shrader et al. | |
| 6,820,204 B1 | 11/2004 | Desai et al. | |
| 6,868,392 B1 | 3/2005 | Ogasawara | |
| 6,871,220 B1 | 3/2005 | Rajan et al. | |
| 6,895,392 B2 | 5/2005 | Stefik et al. | |
| 6,898,576 B2 | 5/2005 | Stefik et al. | |
| 6,910,179 B1 | 6/2005 | Pennell | |
| 6,913,193 B1 | 7/2005 | Kawan | |
| 6,925,439 B1 | 8/2005 | Pitroda | |
| 6,938,021 B2 | 8/2005 | Shear et al. | |
| 6,941,291 B1 | 9/2005 | Zoller et al. | |
| 6,944,776 B1 | 9/2005 | Lockhart et al. | |
| 6,947,556 B1 | 9/2005 | Matyas et al. | |
| 6,947,571 B1 | 9/2005 | Rhoads | |
| 7,003,670 B2 | 2/2006 | Heaven et al. | |
| 7,010,512 B1 | 3/2006 | Gillin | |
| 7,016,877 B1 | 3/2006 | Steele et al. | |
| 7,020,626 B1 | 3/2006 | Eng et al. | |
| 7,028,009 B2 | 4/2006 | Wang et al. | |
| 7,069,234 B1 | 6/2006 | Cornelius | |
| 7,069,310 B1 | 6/2006 | Bartholomew | |
| 7,099,849 B1 | 8/2006 | Reeder et al. | |
| 7,103,574 B1 | 9/2006 | Peinado et al. | |
| 7,120,606 B1 | 10/2006 | Ranzini et al. | |
| 7,130,829 B2 | 10/2006 | Banerjee et al. | |
| 7,191,332 B1 | 3/2007 | Pankajakshan et al. | |
| 7,249,107 B2 | 7/2007 | Yaacovi | |
| 7,275,260 B2 | 9/2007 | De Jong et al. | |
| 7,318,049 B2 | 1/2008 | Iannacci | |
| 7,346,923 B2 | 3/2008 | Atkins | |
| 7,392,226 B1 | 6/2008 | Sasaki et al. | |
| 7,401,221 B2 | 7/2008 | Adent et al. | |
| 7,424,747 B2 | 9/2008 | DeTreville | |
| 7,426,492 B1 | 9/2008 | Bishop et al. | |
| 7,444,519 B2 | 10/2008 | Laferriere et al. | |
| 7,454,622 B2* | 11/2008 | Laidlaw | H04L 63/08 709/225 |
| 7,580,877 B1 | 8/2009 | Argenbright | |
| 7,614,078 B1* | 11/2009 | Stieglitz | 726/2 |
| 7,680,819 B1 | 3/2010 | Mellmer et al. | |
| 7,707,066 B2 | 4/2010 | Roever | |
| 7,707,121 B1 | 4/2010 | Roever et al. | |
| 7,814,025 B2 | 10/2010 | Roever | |
| 8,571,992 B2 | 10/2013 | Roever et al. | |
| 8,738,457 B2 | 5/2014 | Roever et al. | |
| 9,177,338 B2 | 11/2015 | Collins et al. | |
| 2001/0008557 A1 | 7/2001 | Stefik et al. | |
| 2001/0026287 A1 | 10/2001 | Watanabe | |
| 2001/0032312 A1 | 10/2001 | Runje et al. | |
| 2002/0004847 A1* | 1/2002 | Tanno | 709/249 |
| 2002/0026445 A1 | 2/2002 | Chica et al. | |
| 2002/0029183 A1 | 3/2002 | Vlahoplus et al. | |
| 2002/0032646 A1 | 3/2002 | Sweeney et al. | |
| 2002/0038278 A1 | 3/2002 | Himmelstein | |
| 2002/0040346 A1 | 4/2002 | Kwan | |
| 2002/0062249 A1 | 5/2002 | Iannacci | |
| 2002/0082961 A1 | 6/2002 | Abrahm et al. | |
| 2002/0091643 A1 | 7/2002 | Okamoto et al. | |
| 2002/0091646 A1 | 7/2002 | Lake et al. | |
| 2002/0099564 A1 | 7/2002 | Kim | |
| 2002/0106081 A1 | 8/2002 | Yang | |
| 2002/0116471 A1 | 8/2002 | Shteyn | |
| 2002/0129140 A1 | 9/2002 | Peled et al. | |
| 2002/0143703 A1 | 10/2002 | Razvan et al. | |
| 2002/0147929 A1 | 10/2002 | Rose | |
| 2002/0152126 A1 | 10/2002 | Lieu et al. | |
| 2002/0152173 A1 | 10/2002 | Rudd | |
| 2002/0152262 A1 | 10/2002 | Arkin et al. | |
| 2002/0156743 A1 | 10/2002 | DeTreville | |
| 2002/0178082 A1 | 11/2002 | Krause | |
| 2002/0184504 A1 | 12/2002 | Hughes | |
| 2002/0198843 A1 | 12/2002 | Wang et al. | |
| 2003/0004885 A1 | 1/2003 | Banerjee et al. | |
| 2003/0023561 A1 | 1/2003 | Stefik et al. | |
| 2003/0023564 A1 | 1/2003 | Padhye et al. | |
| 2003/0028489 A1 | 2/2003 | Williamson | |
| 2003/0046093 A1 | 3/2003 | Erickson et al. | |
| 2003/0061566 A1 | 3/2003 | Rubstein et al. | |
| 2003/0079122 A1 | 4/2003 | Asokan et al. | |
| 2003/0084171 A1 | 5/2003 | de Jong | |
| 2003/0084302 A1* | 5/2003 | de Jong et al. | 713/185 |
| 2003/0093695 A1 | 5/2003 | Dutta | |
| 2003/0125965 A1 | 7/2003 | Falso | |
| 2003/0131048 A1 | 7/2003 | Najork | |
| 2003/0140003 A1 | 7/2003 | Wang et al. | |
| 2003/0140034 A1 | 7/2003 | Probst et al. | |
| 2003/0159043 A1 | 8/2003 | Epstein | |
| 2003/0182142 A1 | 9/2003 | Valenzuela et al. | |
| 2003/0196087 A1 | 10/2003 | Stringer et al. | |
| 2003/0200439 A1 | 10/2003 | Moskowitz | |
| 2003/0208406 A1 | 11/2003 | Okamoto et al. | |
| 2003/0217006 A1 | 11/2003 | Roever et al. | |
| 2003/0220881 A1 | 11/2003 | Pirhonen et al. | |
| 2003/0229593 A1 | 12/2003 | Raley | |
| 2004/0034601 A1 | 2/2004 | Kreuzer | |
| 2004/0039916 A1 | 2/2004 | Aldis et al. | |
| 2004/0044627 A1 | 3/2004 | Russell | |
| 2004/0044779 A1 | 3/2004 | Lambert | |
| 2004/0054630 A1 | 3/2004 | Ginter et al. | |
| 2004/0054915 A1 | 3/2004 | Jong et al. | |
| 2004/0059678 A1 | 3/2004 | Stefik et al. | |
| 2004/0113792 A1 | 6/2004 | Ireland et al. | |
| 2004/0128546 A1 | 7/2004 | Blakley | |
| 2004/0133548 A1 | 7/2004 | Fielding et al. | |
| 2004/0139207 A1 | 7/2004 | De Jong | |
| 2004/0153552 A1* | 8/2004 | Trossen et al. | 709/229 |
| 2004/0177039 A1 | 9/2004 | Pincus | |
| 2004/0196981 A1 | 10/2004 | Nakano et al. | |
| 2004/0199577 A1 | 10/2004 | Burd et al. | |
| 2004/0221045 A1 | 11/2004 | Joosten et al. | |
| 2004/0243517 A1 | 12/2004 | Hansen | |
| 2004/0267671 A1 | 12/2004 | Nonaka et al. | |
| 2004/0267673 A1 | 12/2004 | Ballard et al. | |
| 2005/0004875 A1 | 1/2005 | Kontio et al. | |
| 2005/0010486 A1 | 1/2005 | Pandhe | |
| 2005/0027804 A1 | 2/2005 | Cahill et al. | |
| 2005/0033700 A1 | 2/2005 | Vogler | |
| 2005/0038707 A1 | 2/2005 | Roever et al. | |
| 2005/0038724 A1 | 2/2005 | Roever et al. | |
| 2005/0091268 A1 | 4/2005 | Meyer | |
| 2005/0096938 A1 | 5/2005 | Slomkowski et al. | |
| 2005/0138374 A1 | 6/2005 | Zheng et al. | |
| 2005/0204168 A1* | 9/2005 | Johnston et al. | 713/201 |
| 2005/0234860 A1 | 10/2005 | Roever et al. | |
| 2005/0246193 A1 | 11/2005 | Roever et al. | |
| 2005/0247777 A1 | 11/2005 | Pitroda | |
| 2005/0251452 A1 | 11/2005 | Roever et al. | |
| 2005/0273805 A1 | 12/2005 | Roever et al. | |
| 2006/0036447 A1 | 2/2006 | Roever et al. | |
| 2006/0036548 A1 | 2/2006 | Roever et al. | |
| 2006/0059070 A1 | 3/2006 | Petruck | |

(56) References Cited

U.S. PATENT DOCUMENTS

| | | | |
|---|---|---|---|
| 2006/0064373 A1 | 3/2006 | Kelley | |
| 2006/0136987 A1* | 6/2006 | Okuda ............................. | 726/1 |
| 2006/0167815 A1 | 7/2006 | Peinado et al. | |
| 2006/0170759 A1 | 8/2006 | Roever et al. | |
| 2006/0174350 A1 | 8/2006 | Roever et al. | |
| 2006/0179003 A1 | 8/2006 | Steele et al. | |
| 2006/0259422 A1 | 11/2006 | Sutton et al. | |
| 2007/0016533 A1 | 1/2007 | Fujimura | |
| 2007/0087840 A1 | 4/2007 | Fayter et al. | |
| 2007/0157320 A1 | 7/2007 | Collins et al. | |
| 2007/0162300 A1 | 7/2007 | Roever et al. | |
| 2007/0208720 A1 | 9/2007 | Probst | |
| 2007/0233602 A1 | 10/2007 | Zweig et al. | |
| 2007/0250453 A1 | 10/2007 | Sako et al. | |
| 2007/0255965 A1 | 11/2007 | McGucken | |
| 2007/0286076 A1 | 12/2007 | Roever et al. | |
| 2007/0286393 A1 | 12/2007 | Roever et al. | |
| 2008/0067230 A1 | 3/2008 | Silverbrook et al. | |
| 2008/0148056 A1 | 6/2008 | Ginter et al. | |
| 2008/0205850 A1 | 8/2008 | Collins et al. | |
| 2008/0243693 A1 | 10/2008 | Thrasher et al. | |
| 2009/0070218 A1 | 3/2009 | Farmanfarmaian | |
| 2009/0119500 A1 | 5/2009 | Roth et al. | |
| 2009/0193249 A1 | 7/2009 | Conrado et al. | |
| 2009/0193526 A1 | 7/2009 | Sweazey | |
| 2009/0275402 A1 | 11/2009 | Backover et al. | |
| 2009/0288012 A1 | 11/2009 | Hertel et al. | |
| 2010/0161444 A1 | 6/2010 | Roever et al. | |
| 2010/0162408 A1 | 6/2010 | Roever et al. | |
| 2010/0257111 A1 | 10/2010 | Veugen et al. | |
| 2010/0299718 A1 | 11/2010 | Roever et al. | |
| 2011/0178861 A1 | 7/2011 | Georgi | |
| 2011/0197285 A1 | 8/2011 | Ginter et al. | |
| 2012/0090018 A1 | 4/2012 | Padhye et al. | |
| 2012/0198513 A1 | 8/2012 | Maida-Smith et al. | |
| 2013/0036476 A1 | 2/2013 | Roever et al. | |
| 2014/0019372 A1 | 1/2014 | Roever et al. | |
| 2014/0236746 A1 | 8/2014 | Roever et al. | |
| 2015/0026080 A1 | 1/2015 | Roever et al. | |

FOREIGN PATENT DOCUMENTS

| | | | |
|---|---|---|---|
| JP | 2002-140631 | 5/2002 | |
| WO | WO 0111452 A2 * | 2/2001 | ............. G06F 21/41 |
| WO | WO 02/11033 | 2/2002 | |
| WO | WO 03098398 | 11/2003 | |
| WO | WO 2007/033005 | 3/2007 | |
| WO | WO 2007/033055 | 3/2007 | |
| WO | WO 2007/078987 | 7/2007 | |
| WO | WO 2007/130416 | 11/2007 | |
| WO | WO 2007/130502 | 11/2007 | |
| WO | WO 2013/019519 | 2/2013 | |

OTHER PUBLICATIONS

Office Action dated Dec. 14, 2009 from U.S. Appl. No. 10/232,861.
Notice of Allowance U.S. Appl. No. 10/414,817 dated Jan. 27, 2010.
Notice of Allowance and Issue Fee Due dated Dec. 24, 2009 from U.S. Appl. No. 10/440,286.
Notice of Allowance dated May 10, 2010, U.S. Appl. No. 10/439,629.
Office Action dated May 26, 2010 11/155,010.
G. Ahn and J. Lam, "Managing Privacy Preferences for Federated Identity Management," in PROC. DIM '05: *Proceedings of the 2005 workshop on Digital Identity Management,* Fairfax, VA. ISA 2005, pp. 28-36.
Alladin/Preview Systems, "HASP SL," Alladin/Preview Systems, 2004.
K. Bohrer and B. Holland, "Customer Profile Exchange (CPExchange) Specification," International Digital Enterprise Alliance, Inc., Version 1.0, Oct. 20, 2000.
D. Burdett. RFC 2801: Internet Open Trading Protocol. [Online]. Apr. 2000. Available: http://www.faqs.org/rfcs/rfc2801.html.
Business.com. Preview Systems, Inc. Profile. [Online]. 2006. Available: http://www.business.com/directory/telecommunications/preview_systems_inc/profile/.
Cover Pages. Internet Open Trading Protocol. [Online]. Dec. 2002. Available: http://xml.coverpages.org/otp.html.
Cover Pages IETF Internet Open Trading Protocol Working Group Publishes RFC for Voucher Trading System . [Online]. May 2003. Available: http://xml.coverpages.org/ni2003-05-15-a.html.
Cover Pages XML Voucher: Generic Voucher Language. [Online]. May 2003. Available: http://xml.coverpages.org/xmlVoucher.html.
B. Cox, J. Tygar, and M. Sirbu, "Netbill Security and Transaction Protocol," *First USENIX Workshop on Electronic Commerce,* Jul. 1995.
FlexTicket. [Online]. Available: http://info.isl.ntt.co.ip/flexticket/index.html.
K. Fujumura et al., "Requirements and Design for Voucher Trading System (VTS)", Mar. 2003, RFC3506, http://rfc.net/rfc3506.html.
K. Fujimura, Y. Nakajima, and J. Sekine, *XML Ticket: Generalized Digital Ticket Definition Language.* 1999.
K. Fujimura and Y. Nakajima, *General Purpose Digital Ticket Framework.* Boston, Mass.: 3rd USENIX Workshop on Electronic Commerce, 1998.
K. Fujimura, H. Kuno, M. Terada, K. Matsuyama, Y. Mizuno, and J. Sekine, *Digital ticket controlled digital ticket circulation.* USENIX, 1999.
K. Fujimura, M. Terada, and J. Sekine, "A World Wide Supermarket Scheme Using Rights Trading System," in *Proc. ICPADS '00: Proceedings of the Seventh International Conference on Parallel and Distributed Systems: Workshops,* Washington, DC, USA, 2000, p. 289.
M. Iguchi et al. Voucher Integrated C2B and C2C Trading Model. May, 2002. [Online] Available: http://wwwconf.ecs.soton.ac.uk/archive/00000272/01/index.html.
T. Hardjono and J. Seberry, *Strongboxes for Electronic Commerce.* Oakland, Calif.: 2nd USENIX Workshop on Electronic Commerce, 1996.
A Jøsang, J. Fabre, B. Hay, J. Dalziel and S. Pope. "Trust Requirements in Identity Management." Australasian Information Security Workshop 2005.
M. Kumar, A. Rangachari, A. Jhingran, and R. Mohan, Sales Promotions on the Internet. Boston, Mass.: $3^{rd}$ USENIX Workshop on Electronic Commerce, 1998.
K. Matsuyama and K. Fujimura, "Distributed Digital-Ticket Management for Rights Trading System", Nov. 1999, $1^{st}$ ACM Conferences on Electronic Commerce.
G. Medvinksy and B. C. Neuman, *NetCash: A design for practical electronic currency on the Internet.* Proceedings of the First ACM Conference on Computer and Communications Security, Nov. 1993.
M. Mont, S. Pearson, P Bramhall "Towards Accountable Management of Identity and Privacy: Sticky Policies and Enforceable Tracing Services," Hewlett Packard, 2003.
OECD. (Jan. 27, 2006) OECD Guidelines on the Protection of Privacy and Transborder Flows of Personal Data [br] [Online]. Available: http://www.oecd.org/document/18/0.2340_en_2649_201185_1815186_1_1_1_1.00.
G. Skinner, S. Han, and E. Chang, "A framework of privacy shield in organizational information systems," *Proceedings of Int'l Conference on Mobile Business,* 2005.
D. Stewart. The Future of Digital Cash on the Internet. [Online]. Available: http ://www.arraydev.c.om/commerce/JIBC/9703-02.html.
M. Terada, H. Kuno, M. Hanadate, and K. Fujimura, *Copy Prevention Scheme for Rights Trading Infrastructure,* 2000.
M. Terada and K. Fujimura, RFC 4153: "XML Voucher: Generic Voucher Language," Network Working Group, Sep. 2005.
M. Terada. RFC 4154: Voucher Trading System Application Programming Interface. Sep. 2005. [Online]. Available: http://www.rfc-archive.org/getrfc.php?rfec=4154.
D. Weitzel "Liberty ID-WSF Implementation Guide" Draft Version 1.0-1.2, Liberty Alliance Project. 2004-2005.
"US Military exchanges now offer best-price guarentees," M2 Presswire. Conventry: Jun. 4, 1998. p. 1.

(56) References Cited

OTHER PUBLICATIONS http://legalminds.lp.findlaw.com/list/cyberia-1/msg31650.html), Robert A. Hettinga, May 29, 2001.
http://www.nettime.org/Lists-Archives/nettime-1-009/msg00214.html, Dr. Richard W. Rahn, Sep. 19, 2000.
Menezes et al., "Handbook of Applied Cryptography", 1997 CRC Press LLC, Section 1.7.
N. Szabo, "Contracts with Bearer" http://szabo.best.vwh.net/bearer_contracts.html, 12 pages (1997).
Kuno et al., "A Digital Ticket Circulation Architecture, 58th Conference Collected Papers (4)", Information Processing Society of Japan, Japan, Mar. 11, 1999, pp. 4-295-4-296.
Office Action dated Oct. 3, 2008 from U.S. Appl. No. 11/094,784.
Office Action dated Sep. 15, 2009 from U.S. Appl. No. 10/873,841.
Office Action dated Mar. 27, 2009 from U.S. Appl. No. 11/096,284.
Office Action dated Feb. 25, 2008 from U.S. Appl. No. 10/873,840.
Final Office Action dated Dec. 3, 2008 from U.S. Appl. No. 10/873,840.
Office Action dated May 28, 2009 from U.S. Appl. No. 10/873,840.
JP Office Action dated Mar. 24, 2009 from JP Application No. 2004-505848.
Office Action dated Feb. 9, 2005 from U.S. Appl. No. 10/232,861.
Office Action dated Jul. 27, 2005 from U.S. Appl. No. 10/232,861.
Office Action dated Dec. 2, 2005 from U.S. Appl. No. 10/232,861.
Office Action dated Jun. 21, 2006 from U.S. Appl. No. 10/232,861.
Office Action dated Nov. 30, 2006 from U.S. Appl. No. 10/232,861.
Office Action dated Jun. 14, 2007 from U.S. Appl. No. 10/232,861.
Office Action dated May 15, 2008 from U.S. Appl. No. 10/232,861.
Final Office Action dated Dec. 5, 2008 from U.S. Appl. No. 10/232,861.
Office Action dated May 22, 2006 from U.S. Appl. No. 10/414,817.
Office Action dated Nov. 28, 2006 from U.S. Appl. No. 10/414,817.
Office Action dated Apr. 30, 2007 from U.S. Appl. No. 10/414,817.
Office Action dated Oct. 3, 2007 from U.S. Appl. No. 10/414,817.
Office Action dated Jun. 11, 2008 from U.S. Appl. No. 10/414,817.
Office Action dated Dec. 24, 2008 from U.S. Appl. No. 10/414,817.
Final Office Action dated Jun. 12, 2009 from U.S. Appl. No. 10/414,817.
Office Action dated Dec. 22, 2005 from U.S. Appl. No. 10/414,830.
Office Action dated Feb. 7, 2007 from U.S. Appl. No. 10/414,830.
Office Action dated Dec. 20, 2005 from U.S. Appl. No. 10/440,286.
Office Action dated Jul. 13, 2006 from U.S. Appl. No. 10/440,286.
Office Action dated Jan. 30, 2007 from U.S. Appl. No. 10/440,286.
Office Action dated Jun. 28, 2007 from U.S. Appl. No. 10/440,286.
Office Action dated Dec. 27, 2007 from U.S. Appl. No. 10/440,286.
Office Action dated Aug. 6, 2008 from U.S. Appl. No. 10/440,286.
Office Action dated Nov. 18, 2008 from U.S. Appl. No. 10/440,286.
Office Action dated Feb. 11, 2009 from U.S. Appl. No. 10/440,286.
Office Action dated Jan. 14, 2008 from U.S. Appl. No. 10/439,629.
Office Action dated Oct. 23, 2008 from U.S. Appl. No. 10/439,629.
Office Action dated Jan. 28, 2009 from U.S. Appl. No. 10/439,629.
Office Action dated Sep. 26, 2007 from U.S. Appl. No. 11/118,608.
Office Action dated May 14, 2008 from U.S. Appl. No. 11/118,608.
Office Action dated Nov. 10, 2008 from U.S. Appl. No. 11/118,608.
Final Office Action dated Apr. 16, 2009 from U.S. Appl. No. 11/118,608.
Office Action dated Mar. 16, 2009 from U.S. Appl. No. 11/146,399.
International Search Report and Written Opinion dated Feb. 16, 2006 from PCT Application No. PCT/US2005/021057.
Notification Concerning Transmittal of Copy of International Preliminary Report on Patentability dated Jan. 11, 2007 from PCT Application No. PCT/US2005/021057.
International Search Report mailed Nov. 25, 2003 from PCT Application No. PCT/US03/15614.
European Office Action dated Oct. 27, 2008 from EP Application No. 03726905.7.
Chinese Office Action dated Dec. 26, 2008 from CN Application No. 03816746.8.
International Search Report and Written Opinion dated Sep. 16, 2008 from PCT Application No. PCT/US07/10560.
International Search Report & Written Opinion dated Dec. 7, 2007 from PCT Application No. PCT/US07/010708.
Notification Concerning Transmittal of Copy of International Preliminary Report on Patentability dated Nov. 13, 2008 from PCT Application No. PCT/US2007/010708.
International Search Report & Written Opinion dated Feb. 20, 2008 from PCT Application No. PCT/US06/48776.
Notification Concerning Transmittal of Copy of International Preliminary Report on Patentability dated Jul. 10, 2008 from PCT Application No. PCT/US2006/048776.
Office Action dated Aug. 24, 2009, U.S. Appl. No. 11/155,010.
Wikipedia—Hash Chain: http://en.wikipedia.org/wiki/Hash_chain, downloaded Feb. 27, 2011.
Office Action dated May 26, 2010 U.S. Appl. No. 11/155,010.
Office Action dated Oct. 1, 2010, U.S. Appl. No. 12/716,089.
Office Action dated May 18, 2011, U.S. Appl. No. 12/716,089.
Office Action dated Sep. 21, 2010, U.S. Appl. No. 11/645,139.
Final Office Action dated May 5, 2011, U.S. Appl. No. 11/645,139.
Office Action dated Nov. 29, 2010, U.S. Appl. No. 11/940,747.
Office Action dated Jul. 12, 2010, U.S. Appl. No. 11/940,753.
Final Office Action dated Jan. 24, 2011, U.S. Appl. No. 11/940,753.
Office Action dated May 2, 2012, U.S. Appl. No. 12/717,007.
Final Office Action dated May 21, 2012, U.S. Appl. No. 11/742,253.
Lamport, "Password Authentication with Insecure Communication", Communications of the ACM, Nov. 1981, vol. 24, No. 11, pp. 770-772.
The UNIX Operating System: Mature, Standardized and State-of-the-Art, a white paper from Aug. of 1997 downloaded from www.unix.org.
Software Requirements Specification template, 2002, section 2.4, Operating Environments, downloaded from www.processimpact.com.
Office Action dated Aug. 24, 2009 from U.S. Appl. No. 11/155,010.
Office Action dated Oct. 4, 2010, U.S. Appl. No. 11/679,760.
Final Office Action dated May 27, 2011, U.S. Appl. No. 11/679,760.
Office Action dated Jan. 5, 2012, U.S. Appl. No. 11/679,760.
Office Action dated Jul. 13, 2011, U.S. Appl. No. 12/717,007.
Office Action dated Oct. 4, 2011, U.S. Appl. No. 12/717,007.
Office Action dated Sep. 30, 2011, U.S. Appl. No. 12/850,454
Office Action dated Aug. 11, 2011, U.S. Appl. No. 11/742,253
Final Office Action dated Aug. 23, 2011, U.S. Appl. No. 11/940,474.
U.S. Appl. No. 11/830,717, filed Jul. 30, 2007, Roever et al.
U.S. Miscellaneous Communication dated Jun. 11, 2010 issued in U.S. Appl. No. 11/155,010.
U.S. Office Action dated Apr. 5, 2013 issued in U.S. Appl. No. 11/155,010.
U.S. Office Action dated Dec. 18, 2013 issued in U.S. Appl. No. 11/155,010.
U.S. Office Action dated Jul. 1, 2013 issued in U.S. Appl. No. 12/716,089.
U.S. Notice of Allowance dated Feb. 5, 2014 issued in U.S. Appl. No. 12/716,089.
U.S. Final Office Action dated Sep. 27, 2012 issued in U.S. Appl. No. 11/679,760.
U.S. Office Action dated May 20, 2013 issued in U.S. Appl. No. 11/679,760.
U.S. Final Office Action dated Feb. 26, 2014 issued in U.S. Appl. No. 11/679,760.
U.S. Advisory Action Before the Filing of an Appeal Brief dated May 28, 2009 issued in U.S. Appl. No. 10/440,286.
U.S. Notice of Allowance dated Jul. 8, 2013 issued in U.S. Appl. No. 12/717,007.
U.S. Final Office Action dated Aug. 31, 2012 issued in U.S. Appl. No. 12/850,454.
U.S. Office Action dated May 22, 2013 issued in U.S. Appl. No. 13/558,238.
U.S. Final Office Action dated Feb. 28, 2014 issued in U.S. Appl. No. 13/558,238.
European Communication dated Oct. 19, 2006 issued in EP Application No. 03 72 6905.7.
European Office Action dated Nov. 6, 2008 issued in EP Application No. 03 72 6905.7.

(56) References Cited

OTHER PUBLICATIONS

European Office Action dated Apr. 9, 2010 issued in EP Application No. 03 72 6905.7.
PCT International Preliminary Report on Patentability and Written Opinion dated Nov. 4, 2008 issued in PCT/US07/10560.
European Extended Search Report dated Nov. 28, 2013 issued in EP 06 847 910.4.
PCT International Search Report and Written Opinion dated Jan. 17, 2013 issued in PCT/US2012/048182.
PCT International Preliminary Report on Patentability and Written Opinion dated Feb. 13, 2014 issued in PCT/US2012/048182.
"The OAuth 2.0 Authorization Protocol", (Abstract) draft-ietf-oauth-v2-28,*Network Working Group, E. Hammer, Ed.,* Jun. 19, 2012, 48 pages.
Cobèna, (2003) "Thèse d'Informatique, spècialitè Algorithmique, Change Management of Semi-Structure Data on the Web", soutenue le 26 Juin 2003 par, *Ecole Doctorale de l'Ecole Polytechnique,* 228 pages.
Fielding, (Jan. 2000) "Architectural Styles and the Design of Network-based Software Architectures", University of California, Irvine, Dissertation, 90 pages.
Manasse ("Why Rights Management is Wrong (and What to Do Instead)", SRC Technical Note, Compaq System Research Center, Jan. 21, 2001, 7 pages).
Tilkov, Stefan, "A Brief Introduction to Rest", posted on Dec. 10, 2007 at http://www.infoq.com/articles/rest-introduction, 10 pages.
Weitzel, "Liberty ID-WSF Implementation Guide," Liberty Alliance Project, May 2004.
U.S. Appl. No. 14/339,325, filed Jul. 23, 2014, Roever et al.
U.S. Final Office Action dated Jul. 23, 2014 issued in U.S. Appl. No. 11/155,010.
U.S. Office Action dated Sep. 23, 2014 issued in U.S. Appl. No. 12/850,454.
U.S. Office Action dated Nov. 7, 2014 issued in U.S. Appl. No. 11/645,139.
U.S. Office Action dated Nov. 7, 2014 issued in U.S. Appl. No. 11/940,753.
U.S. Office Action dated Nov. 5, 2014 issued in U.S. Appl. No. 13/558,238.
Haller et al., (May 1996) "A One-Time Password System", Kaman Sciences Corporation, Network Working Group, Request for Comments 1938, Category: Standards Track, 18 pages.
U.S. Appl. No. 14/245,885, filed Apr. 14, 2014, Roever et al.
U.S. Office Action dated Jan. 5, 2015 issued in U.S. Appl. No. 11/679,760.
U.S. Final Office Action dated Mar. 6, 2015 issued in U.S. Appl. No. 12/850,454.
U.S. Office Action dated Mar. 26, 2015 issued in U.S. Appl. No. 11/940,747.
U.S. Final Office Action dated Feb. 24, 2015 issued in U.S. Appl. No. 13/558,238.
U.S. Appl. No. 14/831,713, filed Aug. 20, 2015, Collins et al.
U.S. Office Action dated Jun. 9, 2015 issued in U.S. Appl. No. 11/679,760.
U.S. Office Action dated Aug. 31, 2015 issued in U.S. Appl. No. 11/742,253.
U.S. Notice of Allowance dated Jul. 10, 2015 issued in U.S. Appl. No. 11/645,139.
U.S. Final Office Action dated May 22, 2015 issued in U.S. Appl. No. 11/940,753.
U.S. Office Action dated Jul. 2, 2015 issued in U.S. Appl. No. 13/558,238.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    op (1)     |   htype (1)   |   hlen (1)    |   hops (1)    |
+---------------+---------------+---------------+---------------+
|                            xid (4)                            |
+-------------------------------+-------------------------------+
|           secs (2)            |           flags (2)           |
+-------------------------------+-------------------------------+
|                          ciaddr (4)                           |
+---------------------------------------------------------------+      4110
|                          yiaddr (4)                           |
+---------------------------------------------------------------+
|                          siaddr (4)                           |
+---------------------------------------------------------------+
|                          giaddr (4)                           |
+---------------------------------------------------------------+
|                                                               |
|                          chaddr (16)                          |      4120
|                                                               |
|                                                               |
+---------------------------------------------------------------+
|                                                               |
|                          sname (64)                           |
|                                                               |
+---------------------------------------------------------------+
|                           file (128)                          |
+---------------------------------------------------------------+      4130
|                       options (variable)                      |
+---------------------------------------------------------------+
```

FIGURE 4

TITLE-ENABLED NETWORKING

1 CROSS REFERENCE TO RELATED U.S. PATENT APPLICATIONS

This application claims priority under 35 U.S.C. 19(e) to U.S. Provisional Patent Application No. 60/746,032 filed Apr. 29, 2006, the entire disclosure of which is incorporated herein by reference for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2007, Navio Systems Inc.

3 BACKGROUND OF THE INVENTION 3.1 Field of the Invention

The present invention provides systems, methods, and software for providing and managing rights to use networks and network services using digital bearer instruments that express at least one right related to providing and/or managing a network or network service. The invention has applications in the fields of computer science, networking, and electronic business methods.

3.2 The Related Art 3.2.1 Titles and Title Validation

A title is a digital bearer instrument that expresses at least one right. Title materials include titles, portions of titles, for example, such as a specific right definition, a reference to a specific title or right, and independently validatable portions of titles. A stub is one example of an independently validatable portion of a title. Title materials may also include specific instances of digital bearer instruments that may not include a specific right. Title materials are presented to title-enabled processes, computers, and devices, which use the presented title materials to operate on and/or facilitate redemption of rights expressed by a title. Titles employed by specific embodiments of the present invention are related to the title technologies provided by Navio Systems, Inc., of Cupertino Calif.

As described in U.S. Patent Publication US 2006-0036548 A1, the entire disclosure of which is incorporated herein by reference for all purposes, titles can be validated by using a title resolver and/or a state server, both of which are components of a title management system. FIG. 1 is a flow chart depicting an example of such a title validation process. The title is submitted by a client to a title resolver service for authentication (1110). The title resolver service examines the title's digital signature (1120). If the digital signature is incorrect, the title resolver service rejects the title and the title validation process terminates with an "invalid title" result. If the digital signature is correct (1130), the title resolver service forwards the title to the state server process for further validation (1140) of the state value in the title's stub. The state server process uses the state value or other indicia that are part of the title (1150), computes a value from these item(s), and compares it against a value stored in a database (1160). If the two values match (1170), the title is validated by the state server (1180). A "title valid" response is returned to the title resolver service (1190), which in turn returns a "title valid" response the client (1200). If the state server cannot validate the title, it returns a "title invalid" response and the validation process terminates. The above example is one method of validating titles; additional methods of validating title materials include digital signatures, comparison of transaction indicia to transaction databases, and other methods well known to those skilled in the art.

According to specific embodiments described in U.S. Patent Publication US 2006-0036548 A1 referenced above, when a title is used (for example, during a redeem action), the title is presented to state server for authentication by a resolver. The state server performs the authentication process and verifies the security indicia contained within the title to that of the current state maintained in the state collection. The security indicium for a title is contained in the titles authenticator stub.

The state server may also perform endorsement and authentication as supported by the title transaction ecosystem. A variety of techniques and algorithms can be supported by the title technology, and the technique and algorithm employed on a particular title can be subsequently conveyed to the state server for authentication. In one class of embodiments, a chained hash mechanism is used for title authentication. According to a particular embodiment, the chained hash may be generated by repeatedly hashing an initial value v which may include title information combined with a random number or other appropriate data using a cryptographically strong hash function H such as MD5 or SHA-1. The first iteration of the chained hash algorithm gives $h0=H(v)$. The second iteration gives $h1=H(h0)$. The nth iteration gives $hn=H(hn-1)$ where n represents the desired length of the hash chain. This hash chain of length n may represent any value within the system from the maximum number of redemptions allowed by a title to the maximum number of users connected to a system, or any other value required by the system. In another embodiment, v may be composed of a random value and a hash of the title to later be used for title integrity verification.

In another embodiment, the state server component may generate hn and securely store n and the value v that was used as the initial hash value for h0. The value hn may then be set in the authenticator stub for the title along with the name of the hash algorithm used to create hn. In one instance, the client may then later present the title upon redemption where the state server may extract the value hn from the authenticator stub along with the hash algorithm name specified by that stub. The state server may then look up its stored values v and n and compute $hi=Hi(hi-1)$ where $h0=H0(v)$ and $i=\{1, 2, 3, \ldots, n\}$. The value hn would be checked for equality with hi and if equal, the title would be authenticated. The server may then store n−1 in place of n, generate a new authenticator stub containing hn−1 and the name of the algorithm used, and return that stub back to the client where the title may be authenticated again using the above process as long as n>0.

In yet another embodiment, the state server generates the hash as defined above and set the values hn, and ye along with the name of the hash algorithm used in the authenticator stub, where ye is the encrypted value v. The state server would only need to store n in this embodiment. Upon redemption, the client would present the title with the authenticator stub containing ye, hn, and the name of the hash algorithm to use. The state server component may then decrypt ye to get vd and compute $hi=Hi(hi-1)$ where $h0=H0(vd)$ and $i=\{1, 2, 3, \ldots, n\}$. The state server component would then verify hi=hn and if true, the title would be authenticated. The server may then store n−1 in place of n, generate a new authenticator stub containing hn−1, ye, and the name of the hash algorithm used, and return that stub back to the client where the title may be authenticated again using the above process as long as n>0.

In yet another embodiment, the client is responsible for generating the hash chain. In one instance, the client generates the value v using the techniques described above or another appropriate method. The client then computes the hash chain hi=Hi(hi−1) where h0=H0(v) and i={1, 2, 3, ..., n}. The resulting hash chain={h0, h1, h2, ..., hn}. The client sends its credentials, h0, and the name of the hash algorithm used, to the state server component. The state server component verifies the client's credentials and stores h0 in its secure data store. Upon title redemption, the client sends the title with h1 and the name of the hash algorithm embedded in the authenticator stub to the state server component for verification. The state server component retrieves h0 from its secure data store and hashes h0 using the algorithm indicated to produce h1*. The title is authenticated if and only if h1=h1*. The state server component then replaces h0 with h1 in its secure data store. The client can no longer use h1. Note that in this embodiment the client will always supply hi and the state server component will always store hi−1. The ith redemption consists of the value hi supplied by the client which the state server component can verify using hi−1. Each such redemption requires no calculations from the client and only a single hash operation by the state server component.

In another embodiment, when a chain of hashes expires, such as n=0, the state server can automatically perform a re-endorsement of the title and create a new chain. The re-endorsement can occur selectively and as permitted on the particular title.

In another embodiment, a random value technique is applied to authenticate a title. A random value is generated by the state server and placed in the authenticator stub. The state server also maintains a record of the random value in its state collection. The random value would be changed by the state server every time the title is authenticated and only the title object with the correct random value would be valid.

3.2.2 Networks, Network protocols, and Network Devices

A network is two or more computers or other devices connected together using a communication system for the purpose of communicating and sharing resources. A network session (or sometimes simply a session) includes a set of discrete network packets that effect a particular communication between one or more computers or devices.

Networks typically comprise dedicated hardware and software systems, commonly called network devices, which function in conjunction with communication links to operably connect two or more computers or network devices. Switches, routers, cable modems, wireless "access points", and firewalls are all non-limiting examples of network devices. One particular type of network device is a wireless access point, such as produced commercially by Netgear of Santa Clara, Calif., Linksys of Irvine, Calif., and Skypilot Networks of Santa Clara, Calif. Wireless access points permit over the air ("wireless") OSI level 1 and 2 communication links between computers and computer networks in accordance with one or more of the 802.11a, 802.11b, 802.11g, 802.11i, and other wireless protocols. Each wireless access point can be configured to respond to and be accessed using at least one public name called a service set identifier (SSID).

Network communications between computers, network devices, and other devices attached to a network are performed using one or more network protocols. The well-known Open System Interconnection (OSI) seven-layer networking model defines several types of network communication. These layers are generally considered a "link layer group" (OSI layer 1-2), "protocol layer group" (OSI layers 3-5), and "application layer group" (OSI layers 6-7). Network protocols may be categorized by the OSI layers in which they are supported, such as link layer protocols like 802.11 as described above, protocol layer group protocols such as TCP/IP, UDP, IPv4, IPv6, MPLS, DHCP, BOOTP, DNS, and application layer group protocols such as SMTP, POP, IMAP, HTTP, SOAP, and SMS. The computer-implemented software or firmware that implements some or all of a network protocol is commonly called a protocol stack.

Network devices typically facilitate movement of discrete units of information, called packets, over communication links between network devices and computers to effect communication and resource sharing. Sometimes, these networks are called packet-switched networks. Network devices inspect packets and process them according to information found in the packet's contents. Typically, this information is located in the packet header, although it could be located anywhere within a packet or sequence of packets.

A user, computer, or device can be granted access to some networks, computers, devices, or shared resources, and not to others, based on the level of service they have contracted for, company or government clearances, who they work for, and a variety of other factors. Access to one or more shared resources, and even to the network itself is provided on the basis of authentication and authorizations of a user, computer, or device. Authentication is the mechanism for proving an identity of the user, computer, or device. Authentication of users is often provided using a user id and password, a network address, or other information possessed by a user or known to the user. Often, these authentication methods rely on the user entering his authentication information into a computer which is then used to authenticate the user.

Authentication of computers and network devices is generally performed using automated mechanisms such as public key infrastructure (PKI). Additional sets of protocols are used to support authentication at a "protocol group layer" using variants of the EAP protocol, or an application group layer, such as RADIUS and Kerberos. Once identified, authorization materials associated with the user, computer, or device can be obtained and used to make access and provisioning decisions.

Authorization is a specification of what the user, computer, or device is allowed to do, and what resources the user, computer, or device is allowed to share and the subsequent enforcement of this specification to restrict or provide the resources authorized for a particular user, computer, or device. Authorizations may extend not only to the access to and use of one or more shared resources, but may include the manner in which one or more services or resources are provided and the percentage of network resources (such as bandwidth) that can be used by a particular user, computer, or device. A substantial infrastructure is required to provide for the authentication of users, computers, and devices, and to provide for the authorization and provisioning of the user, computer, or device in accordance with an authorization specification.

One challenge surrounding the use of network devices and systems is that they have differing authentication, authorization, and even expressions of rights. For example, a router from one network equipment provider may define user access and network traffic rights in a different way than a router from another provider, which in turn may define user access and networks rights differently than a DSL modem.

Additional challenges are provided when a plurality of network devices and servers require multiple authentications from a single user. As each of these authentications and authorizations typically require the user to enter information at a computer, a user is sometimes required to authenticate several times to gain access to a network resource. Additionally, there is generally not a mechanism by which a user can provide authentication or authorization materials to parts of the network between the user and an end network resource.

3.2.2.1 Internet Protocol Version 6 (IPv6)

IPv6 is a network layer protocol for packet-switched networking. It is intended as the successor of IPv4, which is the current version of the Internet Protocol in general use. The changes between IPv6 and IPv4 are relatively conservative, and most transport- and application-layer protocols need little or no change to work over IPv6.

Figure 2:
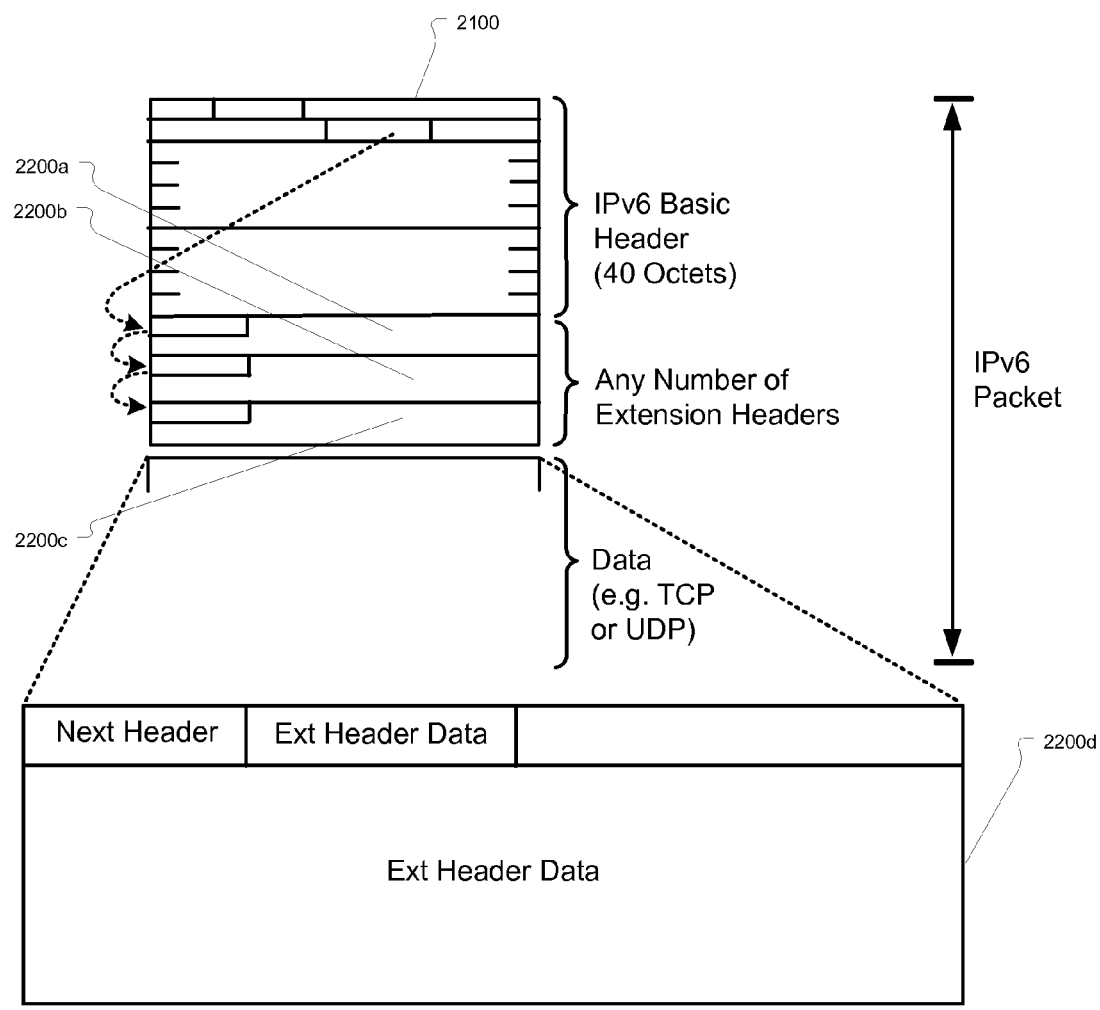

The IPv6 proposed standard (RFC2460, Deering 1998) defines a basic header, and numerous extension headers, including an authentication header, a hop-by-hop options header, a routing header, or a destination options header that may be inserted into an IPv6 packet. FIG. 2 depicts an example of an IPv6 packet, where the IPv6 basic header 2100 is followed by any number of extension headers (2200*a/b/c/* . . . ). 2200*d* depicts the detailed contents of an extension header.

When more than one extension header is used in the same packet, the recommended order is as follows:

IPv6 header (basic header)
Hop-by-hop options header—used to carry optional information that must be examined by every node along a packet's delivery path.
Destination options header (routing header associations)
Routing header—used by an IPv6 source to list one or more intermediate nodes to be "visited" on the way to a packet's destination.
Fragment header—used by an IPv6 source to send a packet larger than would fit in the path MTU to its destination.
Authentication header—used to provide connectionless integrity and data origin authentication for IP datagrams, and to provide protection against replays.
Encapsulating security payload header—used to provide a mix of security services in IPv4 and IPv6.
Destination options header (options processed by final destination)—used to carry optional information that need be examined only by a packet's destination node(s).
Upper-layer header—a "pseudo header" for any transport or other upper-layer protocol that includes the addresses from the IP header in its checksum computation. It uses 128-bit IPv6 addresses instead of 32-bit IPv4 addresses.

IPv6 further defines destination (options) headers as implementation-specific headers. These headers provide space in the protocol frame into which applications or protocol stacks may insert implementation-specific materials, which are then used by applications present on routers, switches, servers, and other network devices to pass information within the protocol framework.

3.2.2.2 MPLS and Network Routing

In computer networking and telecommunications, MPLS is a network protocol that emulates some properties of a circuit-switched network over a packet-switched network. MPLS was designed to provide a unified data-carrying service for both circuit-based clients and packet switching network devices and network clients. It can be used to carry many different kinds of traffic, including IP packets, as well as native ATM, SONET, and Ethernet frames. The standards for MultiProtocol Label Switching (MPLS) are set forth in RFC3031, E. Rosen et. al., January 2001.

An IP packet comprises three elements: the first element is a header, which marks the beginning of the packet; the second element is the payload, which contains the information to be carried in the packet; and the third element is a trailer, which marks the end of the packet. Other protocols, such as XNS, have a similar structure. MPLS works by prepending protocol packets with an additional MPLS header, containing one or more "labels." This list of labels in a MPLS header is commonly called a "label stack." Prepending an existing protocol packet with a MPLS header transforms the existing packet into a MPLS payload. The standards for MPLS Label Stack Encoding are set forth in RFC 3032, E. Rosen et. al., January 2001.

In MPLS networking, a Label Switched Path (LSP) is a path through an MPLS network. An LSP is sometimes referred to as an "MPLS tunnel" because the forwarding of packets through an LSP is opaque to higher network layers. The LSP is set up based on criteria in the forwarding equivalence class (FEC), which is a group of IP packets that are forwarded in the same manner, over the same network path, and with the same forwarding treatment. FEC is typically determined by destination IP address, quality-of-service class, allocated bandwidth, and other implementation dependent factors.

The entrance and exit points of an LSP are both known as Label Edge Routers (LERs), sometimes called ingress and egress routers, or more generically, border routers. When an unlabeled packet enters the LSP path through the ingress router, the router first determines the FEC the packet should be in, appends a MPLS header to the packet, and then inserts one or more labels in the packet's newly created MPLS header. It then forwards the packet along to the next router in the path. Other routers along the path are known as Label Switching Routers (LSRs) or, more generically as transit routers.

When a labeled packet is received by a transit router, the topmost label is examined. Based on the contents of the label, a swap (swap to a new label), push (add another label to the stack), or pop (remove the top label from the stack) operation can be performed on the packet's label stack. Routers can have pre-built lookup tables that tell them which kind of operation to do based on the topmost label of the incoming packet. This enables the routers to process the packet very quickly.

During these operations, the contents of the packet below the MPLS label stack are not examined. The forwarding of the packet is done based on the contents of the labels, which allows "protocol independent packet forwarding" that does not need to look at a protocol-dependent routing table and avoids the computationally expensive IP longest prefix match at each hop along the path. At the egress router, when the last label has been popped, only the payload in the MPLS packet remains. This payload of the packet can be an IP packet, or any of a number of other kinds of information.

An aspect of MPLS routing is that routing must often be performed on the basis of an attribute of a user's device, such as the source IP address, the port that their network packets enter the ingress router on, or other networking-based attribute. There is no simple way to configure a user so that their traffic receives a specific quality of service or allocated bandwidth without considering aspects of the device that the user is using.

Figure 3:
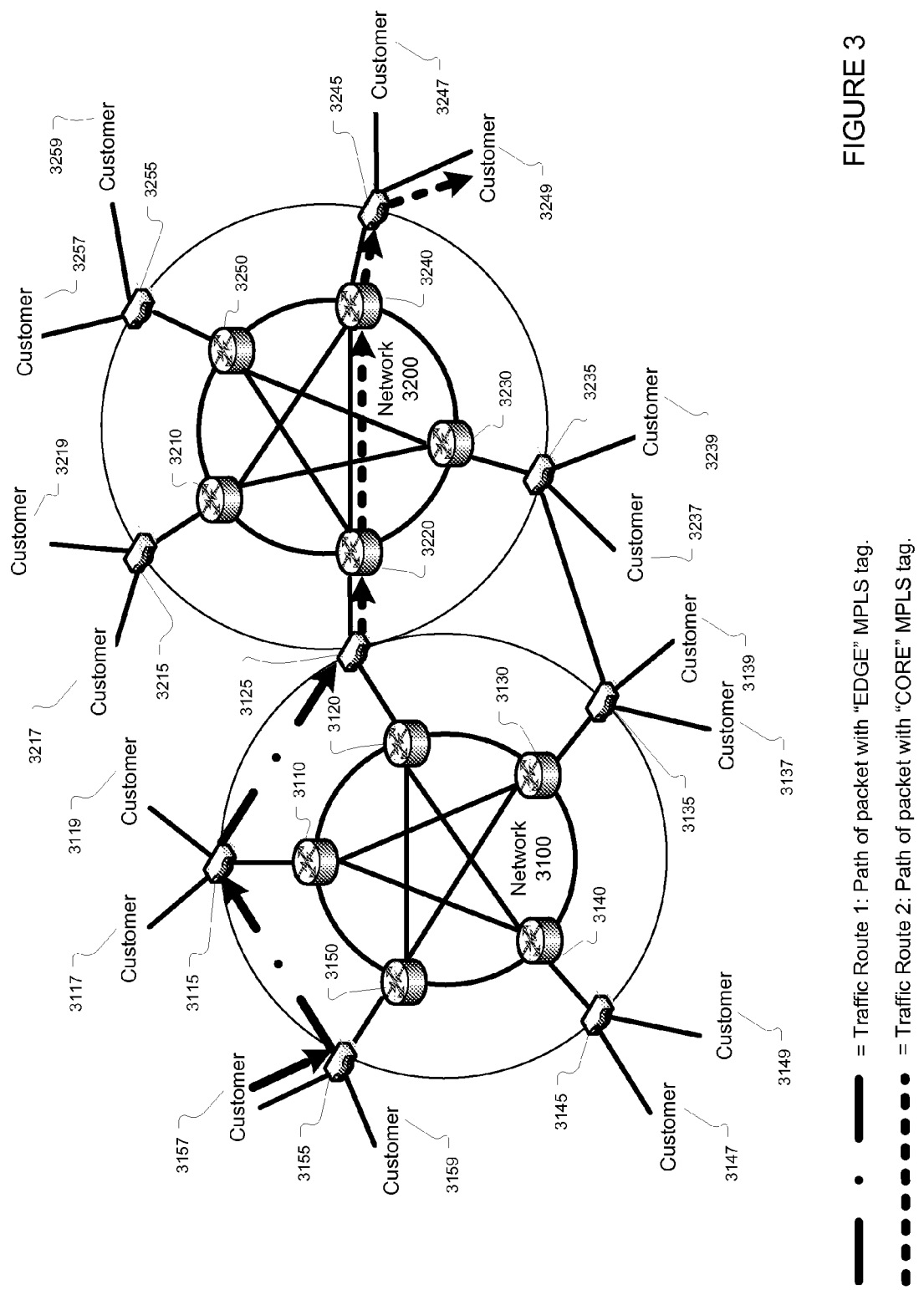

FIG. 3 illustrates an example of a conventional network configuration using MPLS routing. The example MPLS routed network comprises two individual networks (3100, 3200), such as those provided by Internet providers MCI or Sprint that are operably connected to interchange network traffic. Alternatively, the first network can be an enterprise network or metropolitan fiber network and the second network is the Internet or the network of a network service provider. Each network has one or more consumers, enterprises, or security islands operably connected to border routers (3115, 3125, 3135, 3145, 3155) as shown in the first network (3100). These border routers function as ingress and egress routers for network traffic flowing to and from the network. Each border router is connected to one or more additional routers, and is additionally connected to other routers within the network such as core routers (3110, 3120, 3130, 3140, and 3150) as shown in the first network (3100). A second network (3200) with a same or different topology may be connected at a border router that functions as a border router on more than one network (3125). Alternatively, the networks may be configured to pass network traffic from a first border router (3135) that is part of a first network to a second border router (3235) that is part of a second network. Each network manages network traffic within its boundaries in accordance with network traffic routing policies provided by each network's operator. In this example, network 3100 has a network traffic routing policy of routing network traffic that does not terminate within the network (e.g. network 3100) around the edge of the network (e.g. the EDGE policy). Network 3200 uses a different policy, in which all network traffic is routed through the core of the network (e.g. the CORE policy).

In one example, network traffic from a first user 3157 is routed to a first border router 3155 of network 3100, where it is inspected by the border router. The border router identifies the network address of the destination (3249) as belonging to network 3200, and has a routing policy that indicates that traffic should be routed in accordance with a specific routing policy that routes all traffic between the ingress and egress routers via edge routers (excluding the traffic from the core routers of the network). In this example, the routing policy is defined using a MPLS label corresponding to the "EDGE" policy that is configured as a LSP around the edge of network 3100 to the egress router (3125) that is operably connected to network 3200. The route of packets following the "EDGE" routing policy are depicted in FIG. 3 by traffic route 1 as indicated on the drawing by the line with dots and dashes. The first border router (3155), functioning as an ingress router, identifies the FEC corresponding to the traffic and adds a MPLS header and label corresponding to the "EDGE" routing policy to the network traffic. The router then routes the network traffic in accordance with its MPLS label, e.g. around the edge of the network to router 3115, then on to border router 3125. Border router 3125 functions as an egress router for network 3100 and as an ingress router for network 3200, and can operate in a variety of configurations. The net result of these configurations is typically that the network traffic is relabeled with a MPLS label corresponding to the "CORE" policy when it enters network 3200. The network traffic is then routed to its egress border router (for example, from 3220 to 3240 to 3245) and to its destination (3249). The route packets following the "CORE" routing policy are depicted in FIG. 3 by traffic route 2 (indicated with dashes).

Different routing policies may be applied based upon different source and destination addresses, network traffic type (e.g. VoIP traffic may have a higher priority than file transfer traffic), allocated bandwidth, desired quality of service, or other aspects of the network traffic. Unfortunately, there is no way for a user to connect in on various networks and receive an appropriate service level without a wide-reaching service infrastructure that encompasses all of the routers and requires specific authorization and sign-ons.

3.2.2.3 Provisioning, Dynamic Addressing and DHCP and BOOTP Protocols

Provisioning is the process by which a device is configured to operate on a network. In simplest form, a provisioning process is performed when a device is to be connected with a network. Provisioning may be manual, where a user or administrator forms the association between a device and a network, and optionally assigns one or more network configuration parameters such as network addresses to specific devices. Optionally, provisioning may be automatically performed. Numerous provisioning protocols have been introduced, one common protocol is called the Dynamic Host Configuration Protocol.

Dynamic Host Configuration Protocol (DHCP) is a network protocol for automatically provisioning devices on a network. DHCP is a client-server protocol between a "client" network device (e.g. the device that requires provisioning) and a "server" network device, which provides the provisioning information. DHCP is an extension to a prior generation provisioning protocol called BOOTP.

DHCP is generally used to assign network addresses and other network configuration parameters to devices that are connected to the network in a process called dynamic addressing. By using dynamic addressing, a device can have a different IP address and other network parameters each time it connects to the network. Many ISPs use dynamic IP addressing for dial-up users. In some systems, the device's IP address can even change while it is still connected. DHCP also supports a mix of static and dynamic IP addresses. The standards for Dynamic Host Configuration Protocol (DHCP) are set forth in RFC2131, R. Droms, March 1997. BOOTP is interoperable with DHCP, and is primarily described in RFC1534 and RFC1542.

Dynamic addressing simplifies network administration because the software keeps track of IP addresses rather than requiring an administrator to manage the task. This means that new devices can be added to a network without having to manually assign a unique IP address to each device. Dynamic addressing also allows network addresses to be assigned on an "as-needed" basis, which is increasingly important due to the finite number of IP addresses and the ever-increasing number of devices being used on networks (including computers, cellular phones, handheld devices, etc.).

FIG. 4 depicts the format used for DHCP messages. DHCP introduces a small change in terminology (from BOOTP) intended to clarify the meaning of one of the fields. What was the "vendor extensions" field in BOOTP has been re-named the "options" field (4130) in DHCP. Similarly, the tagged data items that were used inside the BOOTP "vendor extensions" field, which were formerly referred to as "vendor extensions," are now termed simply "options." Any DHCP packet may have options associated with it. In typical use, a client obtains network information, including IP address, from a DHCP server using the following process:

In a first step, sometimes called the "discovery" phase, the client broadcasts a DHCPDISCOVER message on its local network to find available DHCP servers. In some embodiments, a client may include "options" in its DHCPDISCOVER message. DHCP servers may use information in the DHCPDISCOVER message, including options information in determining whether to respond to a DHCPDISCOVER message.

In second step, known as the "offer" phase, the DHCP server responds to a client broadcast by reserving an IP address for the client and sending a DHCPOFFER message back across the network to the client. The DHCP server typically determines the IP address configuration based on its configuration database. In some embodiments, the determination is made based upon the client's hardware address (e.g. MAC) as specified in the CHADDR field (4120). The DHCP server specifies the reserved/offered IP address in the YIADDR (4110) field, and may provide other network configuration parameters options fields. The offered IP address and other network configuration materials are said to be "leased" to the network client/device.

In a third step, known as the "request" phase, the client receives the offer and requests the address that the server specified using a DHCPREQUEST message. If the client has received offers from multiple servers, it specifies the DHCP server from which it has accepted the offer and specifically rejects offers from all other servers. DHCPREQUEST also can be used to request the client's last-known IP address from a specific server. If the client is still in a network where the former IP address is valid, the server might grant the request. DHCPREQUEST also can be used to request an extension in the lease of an existing IP address.

In the fourth and final step, known as the "response" phase, the DHCP server receives the DHCPREQUEST message from the network client and returns a DHCPACK acknowledgment packet to the client. This packet includes information such as the lease duration for the IP address and any other network configuration information that the client might have requested. The client configures its network interface with the supplied information. At this point, the network configuration process is complete.

DHCP is implicitly limited in that it provides fixed network parameters, but is unable to request provisioning in accordance with rights or entitlements for other network-specific attributes such a quality of service or specific minimum or maximum bandwidth.

3.2.2.4 Wide Area and Public Network Access

Figure 5:
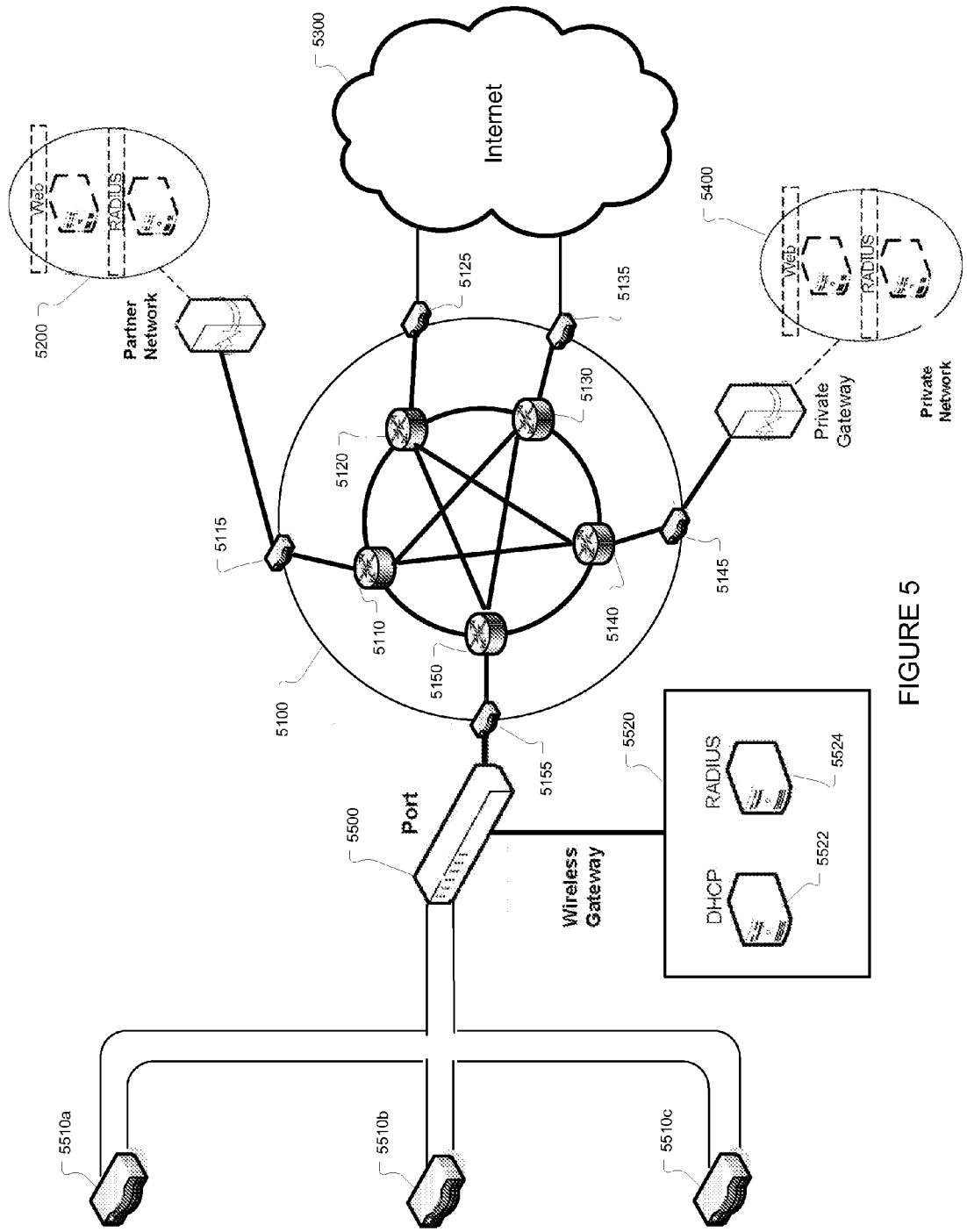

FIG. 5 illustrates a conventional network where a user can be connected to the Internet (5300), to a private network (5400) (such as a corporate or campus network), to a partner network (5200) (such as AOL and Earthlink), or to a public network (5100) (such as wireless network "hot spots" provided by some cities, towns, and commercial providers such as Boingo Wireless of Santa Monica, Calif.). Networks often carry network traffic from a variety of customers; some of this traffic is accorded differentiated service levels based upon the user, their organization, or other criteria. In some cases, authentication to this class of network is by userid/password, pre-defined wireless access point credentials, or by other mechanisms. A user may have access to some network features and capabilities and not to others, based on the level of service they have contracted for, company or government clearances, and a number of other factors. Furthermore, an individual user may be entitled to one or more levels of service upon the basis of a plurality of memberships or other rights that they have based upon group or organization membership, subscription, or other attribute.

Today, each individual differentiation mechanisms requires the user to have separately pre-programmed their personal devices. This is costly from a provisioning and support standpoint. Additionally, the network provider must provide specialty provisioning at nodes and points of presence of wide area and public networks in order to support a plurality of types of differentiated service. Again, this is costly from a provisioning and deployment standpoint. Depending upon the equipment used in constructing the network, there are various limitations in the number of types of specialty provisioning that are supported for each point of presence. These costs and limitations limit the number and types of traffic that may connect to a point of presence and be served by a wide area or public access network.

An example of a typical public wireless network (5500) is shown in FIG. 5, such a public network might be found within airports, malls, coffee shops, and other locations. Alternatively, such a public network might be a simplified network diagram of a citywide wireless network of the type being installed in major metropolitan areas around the USA. Such a typical public wireless network might include a plurality of wireless access points (5510*a/b/c*), using such technologies as 802.11a, 802.11b/g, mesh networking technologies, and other wireless networking mechanisms known to those skilled in the art. Collectively, these are the points of presence for the wireless network. Each of these points of presence is connected using traditional networking technologies to one or more wireless gateways, routers, or switches. The wireless gateway is used to route DHCP and subsequent authentication traffic to one or more DHCP servers (5522) and RADIUS servers (5524) operable on the public wireless network. In some embodiments, the DHCP server and RADIUS server chosen may be one of a network connected to an example of a public wireless network. The DHCP server may provide different network configuration parameters (e.g. network and gateway addresses) to a device connecting to the wireless network based upon, for example, the SSID of a wireless access point that the device is connected to. Setting up each of these SSIDs and managing the DHCP services based on the SSID is a complex and time consuming task, and is further complicated by authentication requirements once the connection is established. The use of static SSIDs requires the use of real-time authentication mechanisms, as a device that is no longer eligible to access the network may retain the SSID configuration on their wireless device after their privileges have lapsed.

In some implementations, separate authentication mechanisms must be provided by a network provider to require that users of devices connected to a network are actually authorized to use the network. Failure to separately authenticate to the network may cause a device or user of a device to not receive contracted levels of service from the network, if service is provided at all.

Network traffic to and from the wireless access points (5510*a/b/c*) and the Internet (5300) and private (5400) or public (5100) networks attached to an example of a public wireless network (5500). In some network implementations, the network traffic is routed using MPLS or a related routing technology. Any required differentiated service that is performed or managed can also be provided using MPLS or a related routing technology, as described above.

One additional aspect of conventional wireless networks is that a user must often be able to operate on one or more of these networks because they "roam" from network to network. This increases the complexity of the network, requires a plurality of RADIUS and other authorization/authentication servers, and complicates the user's portable device configurations. Each configuration of the user's portable device also may interfere with one or more other configurations of the portable device.

4 SUMMARY OF THE INVENTION

According to various embodiments of the invention, methods and apparatus are provided for processing packets in a network. A received packet includes title materials which include one or more of a title object, a component of the title object, or a reference to the title object. The title object is a digital bearer instrument representing at least one right relating to processing of the packet in the network which may be redeemed by presentation of the title object to a title-enabled device or process operating in the network. Upon validation of the title object, the packet is processed in the network in accordance with the at least one right represented by the title object.

According to specific embodiments of the invention, processing the packet includes one or more of dynamically provisioning an aspect of the network, or mapping the packet onto a previously provisioned aspect of the network. According to more specific embodiments, the aspect of the network may be one or more of an end user device, a server, a modem, a router, a switch, a network appliance, a point-of-presence device, a wireless access point, a gateway, a firewall, a process, or a network service.

According to specific embodiments, the at least one right represented by the title object relates to one or more of network access, quality of service, level of service, packet traffic protection, traffic class, or traffic priority.

According to specific embodiments, processing the packet comprises manipulation of the packet in accordance with one or more of a plurality of protocols including one or more of MPLS, DHCP, BOOTP, IPv4, IPv6, TCP/IP, UDP/IP, DNS, GSM, CDSA, iDEN, 802.11a, 802.11b, 802.11g, 802.11i, 802.11n, WiMax, uPNP, telnet, FTP, SMTP, POP, IMAP, HTTP, SOAP, XML-RPC, and SMS.

These and other aspects and advantages will become apparent when the Description below is read in conjunction with the accompanying Drawings.

5 BRIEF DESCRIPTION OF THE DRAWINGS

Figure 6:
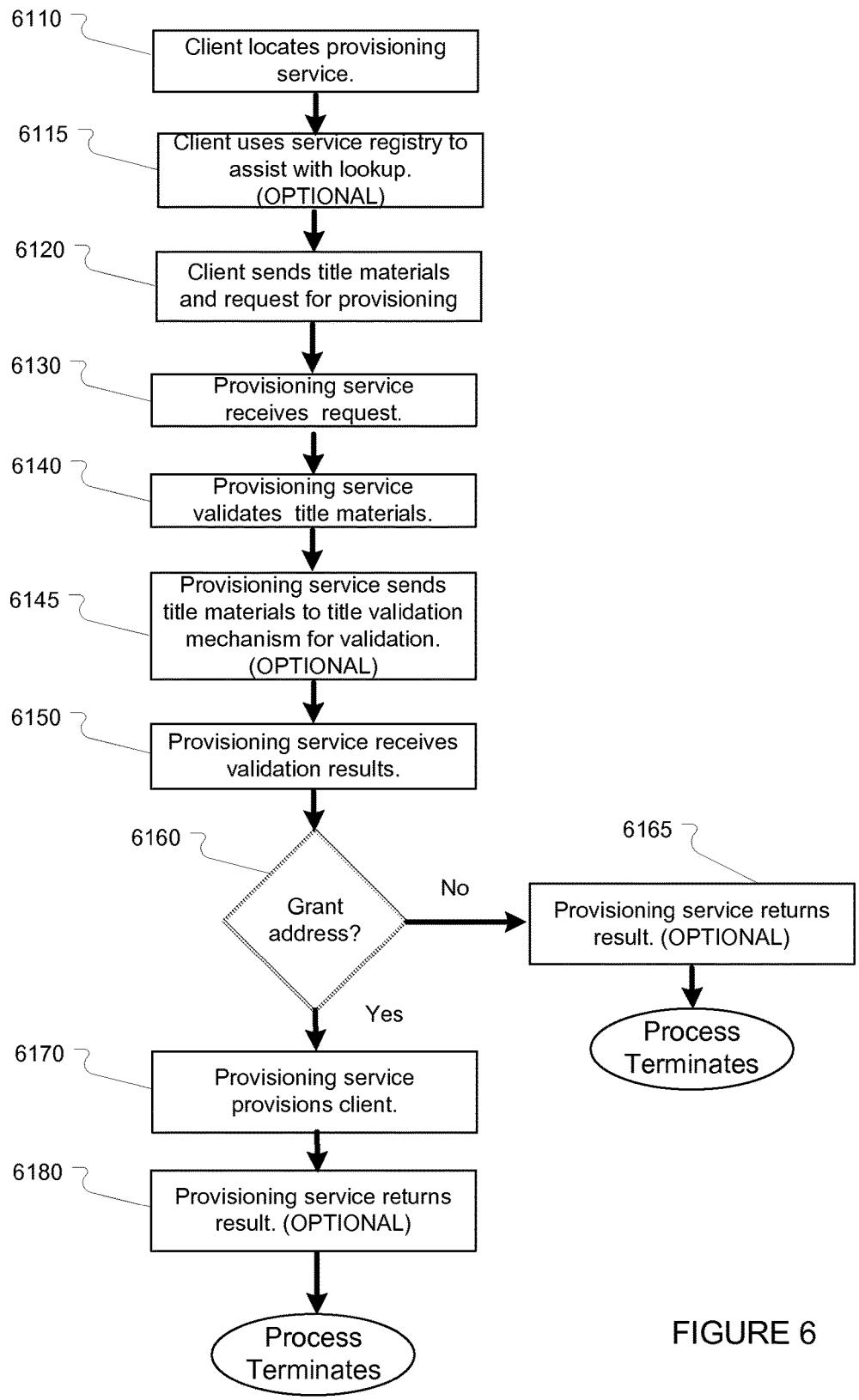
Figure 7:
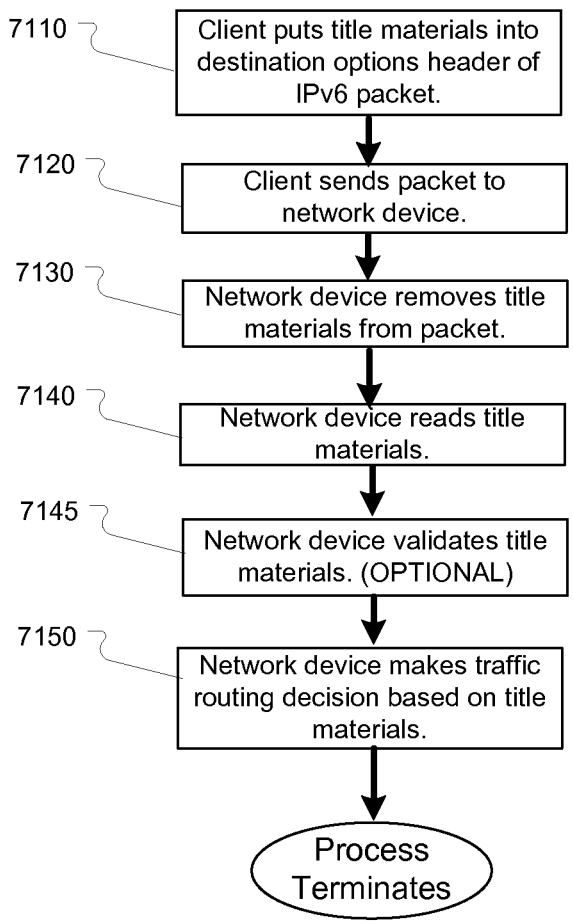
Figure 8:
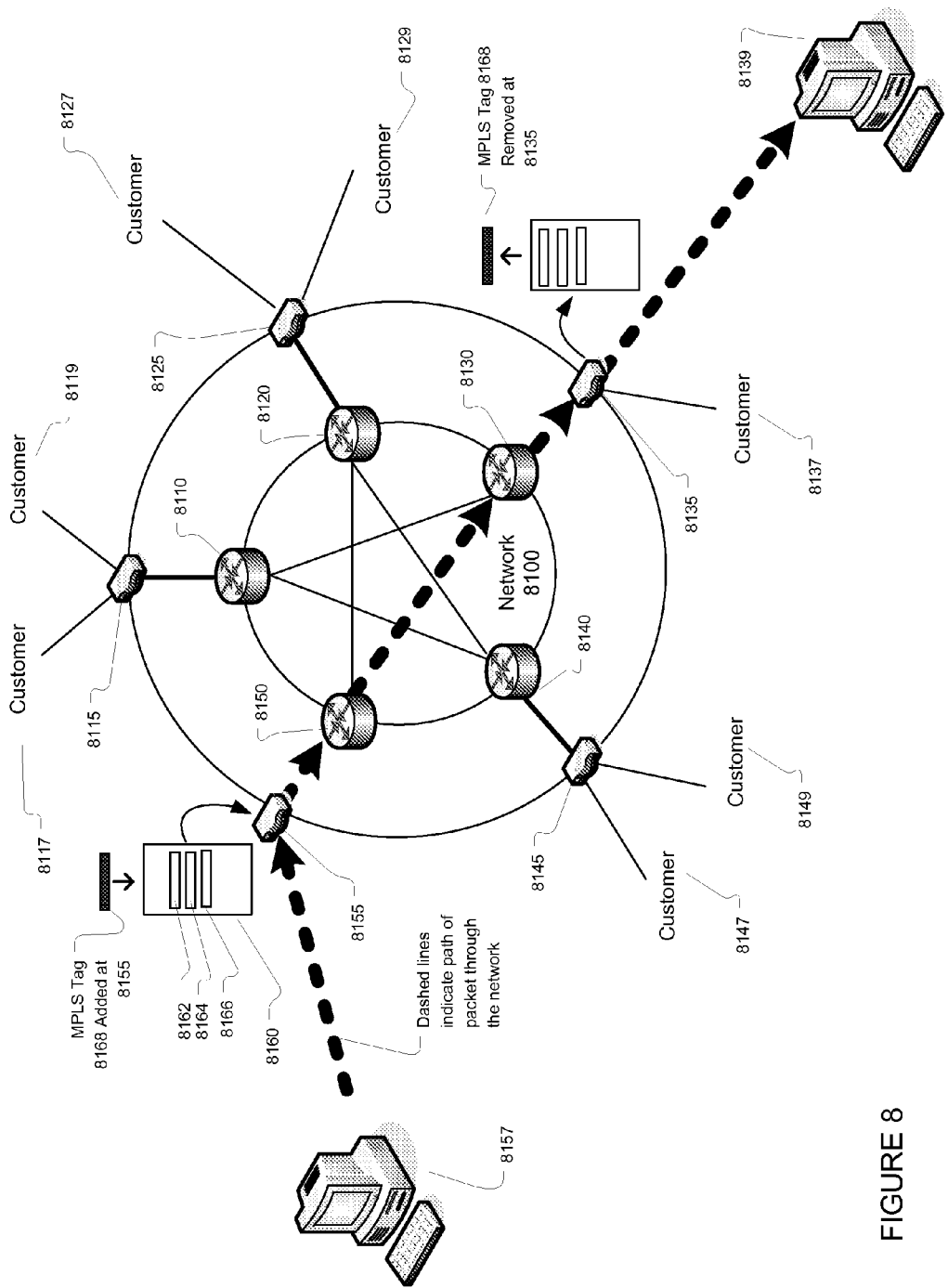
Figure 9:
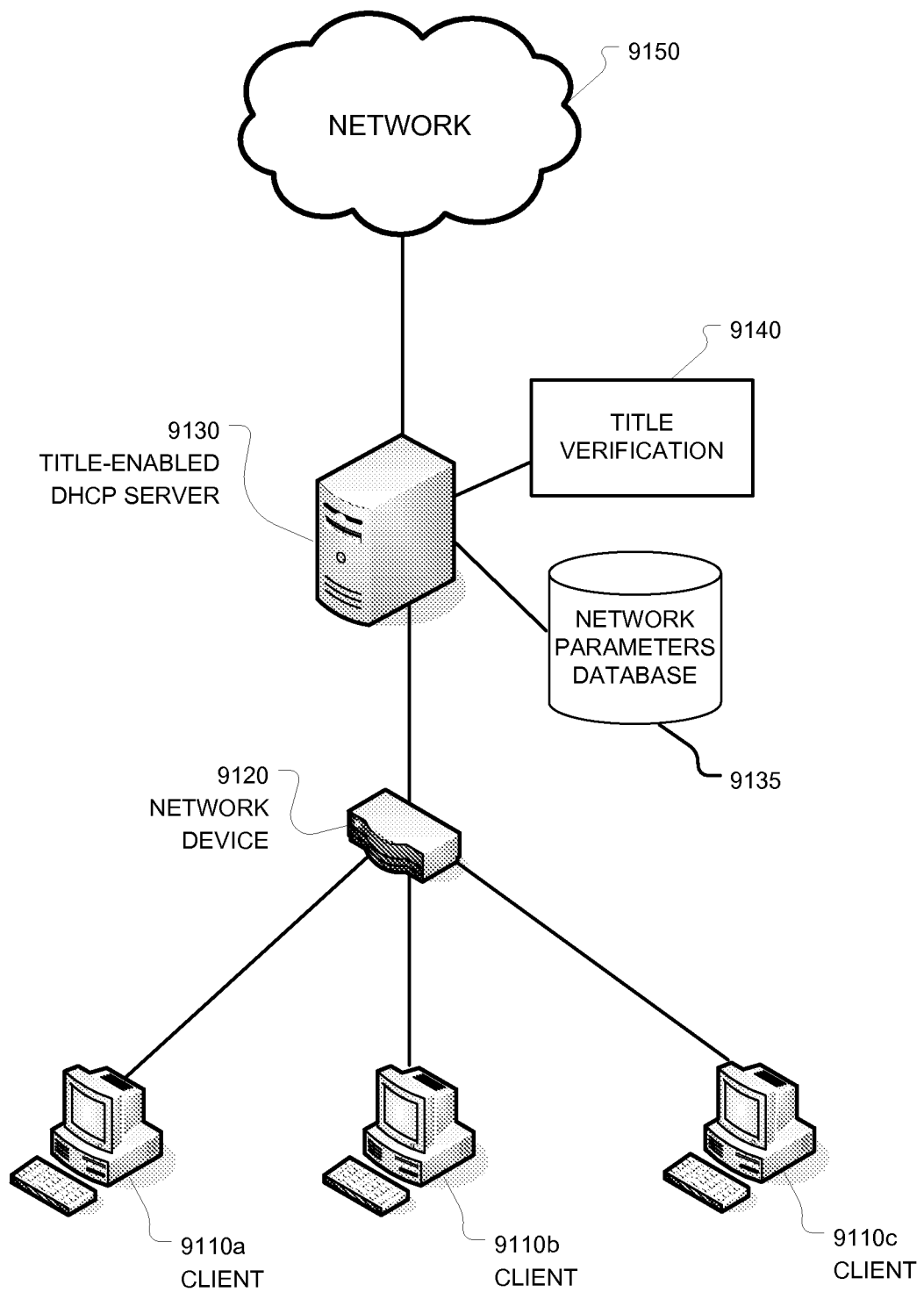
Figure 10:
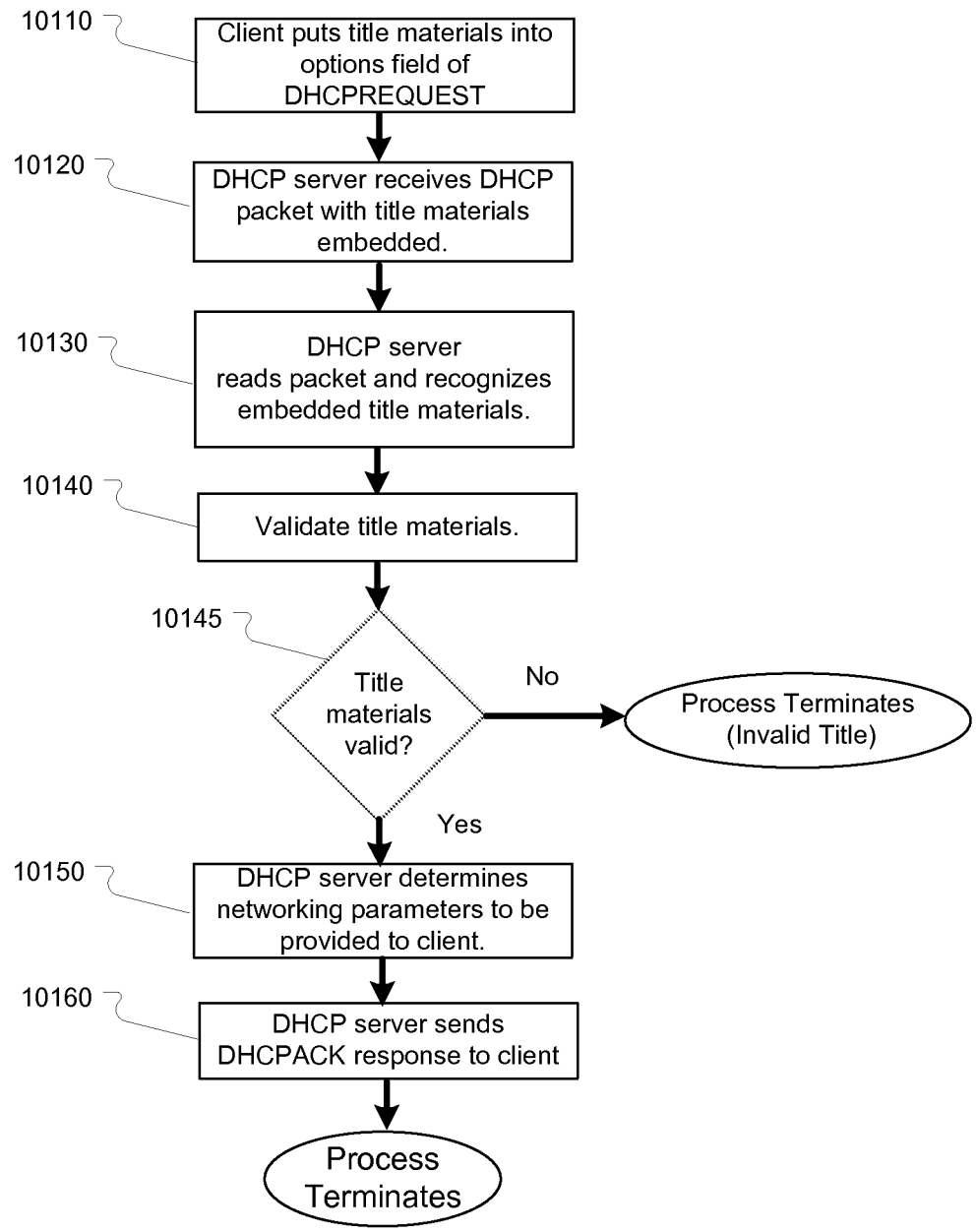

FIG. 1 depicts an example of a title validation process.
FIG. 2 depicts an example of an IPv6 packet.
FIG. 3 depicts a network using MPLS routing.
FIG. 4 depicts the format used for DHCP messages.
FIG. 5 illustrates a wireless "hot spot" network.
FIG. 6 is a flowchart depicting an example of using title materials to locate and receive a network address through a provisioning service.
FIG. 7 is a flowchart illustrating an example of embedding title materials into an IPv6 destination options header.
FIG. 8 illustrates an example of embedding title materials within an IPv6 protocol packet and subsequent routing using MPLS on the basis of the title materials.
FIG. 9 depicts an example of a title-enabled DHCP server connected to a title verification mechanism for title validation.
FIG. 10 is a flowchart illustrating an example of a client acquiring a DHCP address through the use of title materials in a DCHP request message.
FIGS. 11A-D depict different examples of ways in which title-enabled network devices can handle a packet including title materials.

Figure 12:
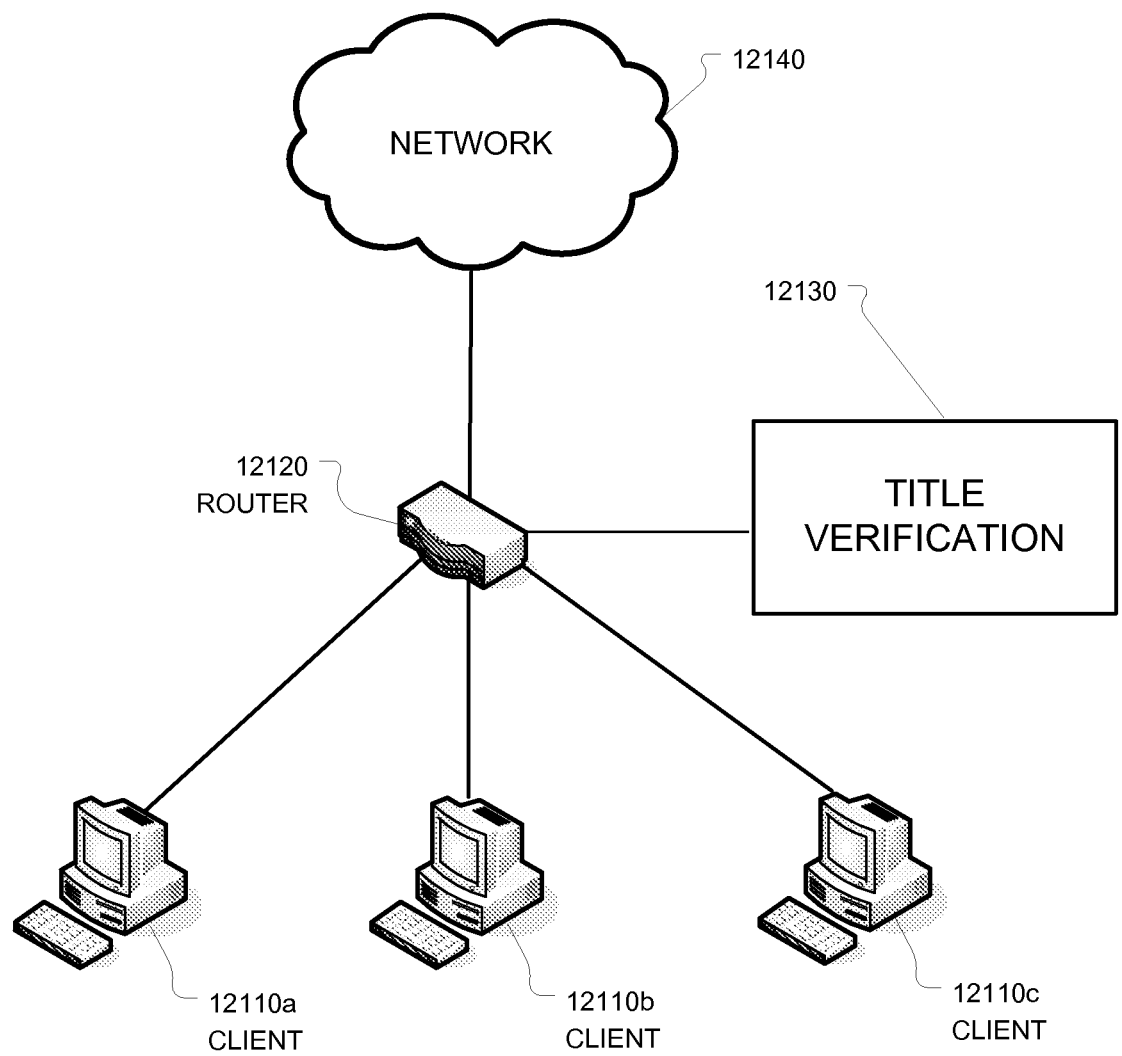
Figure 13:
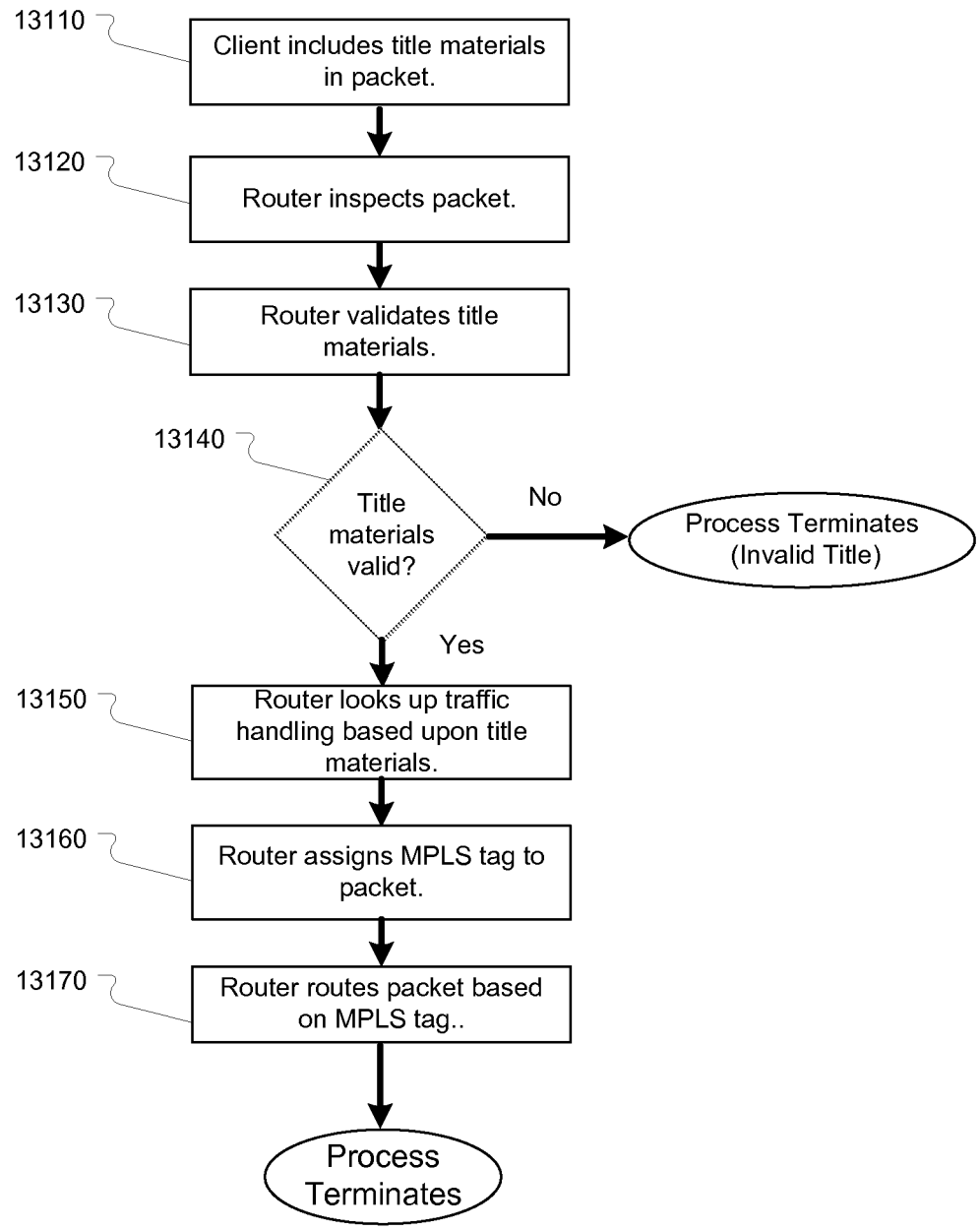
Figure 14:
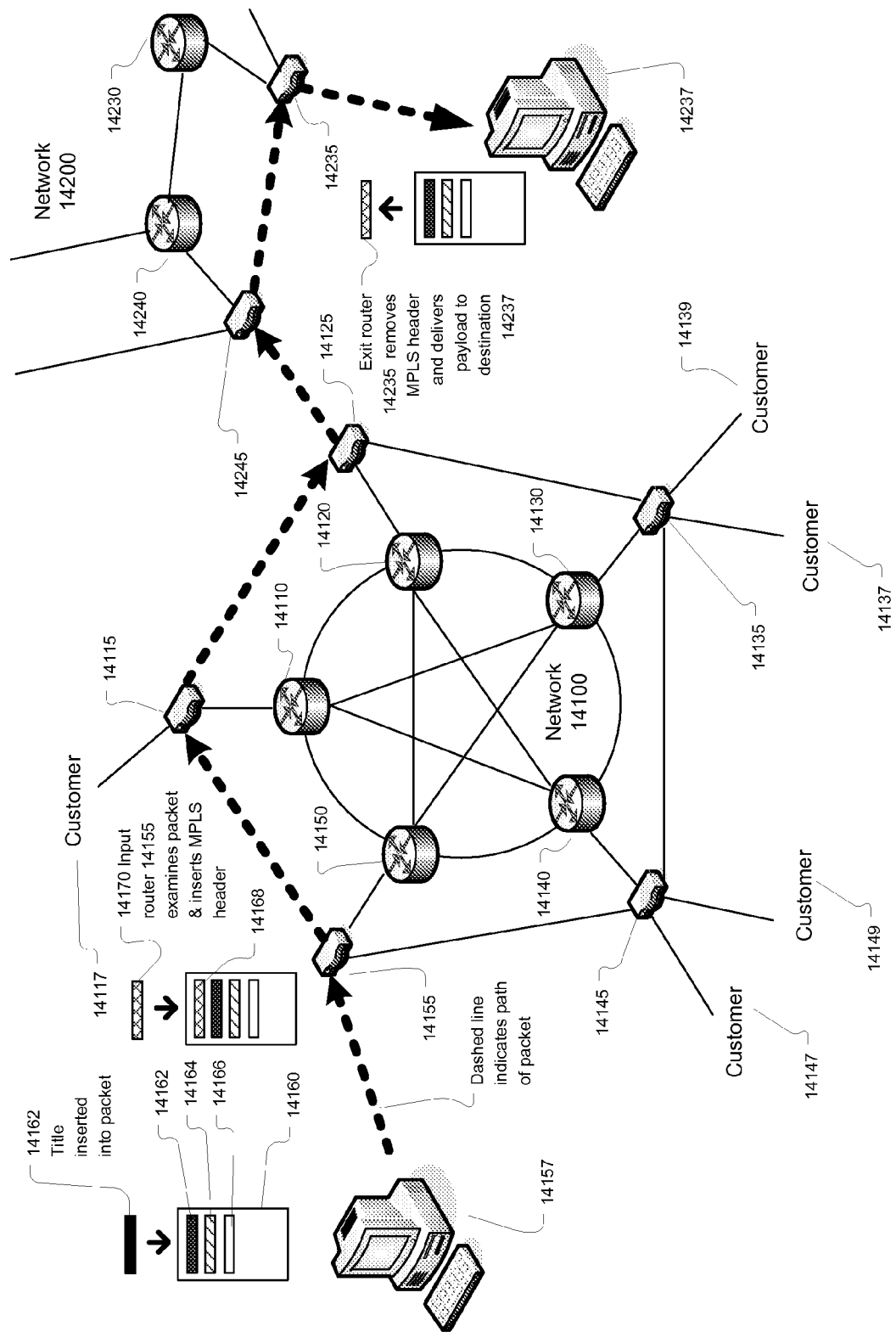

FIG. 12 depicts an example of a router connected to a title resolver (or other title validation mechanism) for title materials verification.
FIG. 13 is a flowchart depicting an example of a process of routing a packet based on an MPLS tag assigned using title materials.
FIG. 14 depicts an example of title-enabled routing using MPLS headers.

6 DESCRIPTION OF SPECIFIC EMBODIMENTS OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

6.1 Title-Enabled Networking and Networks

Each title (also referred to herein as a title object) is a digital bearer instrument that is independently authenticatable and describes or represents at least one right. A title component is one or more aspects of a title, ranging from part of a title up to and including the whole title, that is used by at least an aspect of a network to effect configuration, provisioning, routing, service provision, or some other aspect of network functionality. A title component may comprise the specification of a specific right, an independent portion of a title such as a stub, any uniquely identifiable and verifiable portion of a title, and/or a reference to a specific title or right. Titles and title components are more generically referred to herein as "title materials."

The entitlement, or right(s), of a device or a user to perform specific actions in conjunction with a network device can be based, in part, upon the title materials presented by the device or user. A device's or user's presentation of title materials can be a manual action. Alternatively, the action can be an automated one performed, at least in part, by software on the user's local computer or portable device. Thus, a user can provide a title to a device that describes at least one aspect of their rights and privileges on a specific network device, on a class or set of network devices of which the specific network device is a member, on a specific network, or upon a class or set of networks.

In some embodiments, it is desirable for aspects of a network to be controlled, not by static routing and inflexible configurations, but by aspects of a device, user, or an affiliation or right granted to a device or user. The use of titles is advantageous in these circumstances, in that they provide an independent mechanism for describing rights and capabilities associated with those rights. In some embodiments, titles can express a plurality of rights, and may further express sets of rights. One particular advantage of using titles to express rights to use network resources is that they can flexibly express these rights to use one or more network services or systems using either common or device specific ways, and may even express a specific right in a variety of ways that can be collectively understood by a plurality of network devices. One or more rights in a title may embody specifications or configuration information effective to control a particular aspect of a network. These specifications and configuration information can be extracted from a title structure and used by an aspect of a network.

Another particular advantage of using title materials to support network provisioning is that titles, as digital bearer instruments, may be presented by a device on behalf of a device or user without requiring the device or user's intervention. The title can be independently authenticated by one or more aspects of the network and the desired services automatically provided. It is often advantageous for devices and users to not be required to authenticate each time they attempt to use a different aspect of one or more networks. The use of title materials in controlling network capabilities may be transparent to the user, and therefore has the potential to limit the number of personal authentication and related interactions a user must have with a network.

In a particular embodiment, at least one aspect of the use of a network and/or specific network resources can be controlled, in whole or in part, based upon title materials that can be presented by either a person or a machine seeking to use the network. The term "user" as used herein encompasses both types of use, either by a machine or by a person. In this example, a user (either an actual person, a device on behalf of a person, or a device itself) presents title materials that describe that user's rights of access, level of service(s), and possibly other network attribute(s) that the user is entitled to use.

Network devices, including such devices as modems (for example, telephone, DSL, or cable), routers and switches and the like, can make routing and network traffic management decisions on the basis of presented title materials. In some embodiments, network configurations are produced that correspond to one or more aspects of a right or entitlement, and a network device may make its routing and network traffic management decision on the basis of a network configuration that represents an aspect of a right expressed by title materials. In a specific embodiment, a router may use title materials to determine the quality of service or bandwidth a particular user is entitled to receive. A MPLS tag associated with specific routing information stored in a group of routers is an example of a network configuration information that represents an aspect of a quality of service or network bandwidth right. Specifically, a title-based right may include one or more MPLS tags that may be used to specify an aspect of a title-based right to use a network. Similarly, a title-based right to use an aspect of a network may reference an external system, directory, or database that further provides these materials usable by the network to provide the right. In such embodiments, resolving the right would involve looking up the network information in the external system, directory, or database to obtain the specifications for configuring at least one aspect of the network to provide network service.

In another example, title materials can provide a user with the ability to connect to the Internet at any of the network's point-of-presence locations (e.g., wireless "access points"). In this use, the title materials can replace traditional user-password pairs for mobile users and eliminate the infrastructure requirements of a plurality of SSIDs and further permit the reduction in the number of authentication servers required to support a network. In addition, when used in conjunction with a premise-based device such as a DSL or cable modem, title materials can be used to define the service levels to be provided (e.g., data transfer rate), and to enable the provision of differentiated service based upon rights presented by a user of the network device (instead of the location of the network device), or even upon the originator of specific network packet traffic. Thus, a network provider such as Comcast, Verizon, or other provider can provide quality of service and differential bandwidth specific services to users that connect from any point of presence on their network upon presentation of that user's title materials. The technologies are further advantageous to the network providers in that they no longer have to provision the premise devices for network speed limitations, differing SSIDs, or network address ranges, or to build elaborate policies and configurations to map specific address ranges or SSIDs to specific classes of service. All of these improvements reduce the deployment and maintenance costs for deploying networks. This same technology allows a user to acquire rights to specific network services and for those services to be ubiquitously provided, even across network providers.

Network services also may be "title aware" and provide differentiated service upon the basis of one or more title materials presented to the service. One example is a title-aware DHCP service, which is explored in greater detail below. Other network services, including provisioning and authorization services such as various variants of EAP, can also be made title aware and be used to provide similar benefits as the described DHCP example embodiment.

Title materials also can be embedded in network protocols. In some embodiments, the network protocols may be specially crafted to embed title materials. These protocols are effective to transport title materials from a first location on a network to a second location on a network. In other embodiments, network protocols such as TCP/IP, DHCP, and EAP that are not originally designed for use with title materials may have title materials embedded within them.

Alternatively, protocol stacks present on network devices and computers operating on a network may be title-aware. Protocol stacks can seamlessly insert, remove, and use title materials in networking protocols on an as-needed basis to effect the use of rights expressed in at least one title materials.

Collectively, title-enabled network devices, network services, and protocol stacks may be combined to produce one or more title-enabled networks. Title-enabled networks generally include at least one title resolver or state server. In some embodiments, these components are provided as stand-alone services or servers. In other embodiments, they may be configured as part of one or more network devices. In yet other embodiments, a title resolver or state server may be provided externally to a title-enabled network.

In some embodiments, the presentation of invalid or expired title materials will result in the user's being denied access to a network. In alternative embodiments, the presentation of invalid or expired title materials will permit the user to access the network, but may limit at least one aspect of the network that the user is permitted access to. In a particular embodiment, the limited network access that a user is provided with may only provide sufficient network services to update their title materials with valid, unexpired title materials.

In other aspects of the present invention, access to, or use of at least one aspect of a network may be enabled by title materials. These title materials may be configured for a short "life," e.g., they become invalid after a specific number of uses or after a specific period of time has passed. Title materials may be updated either before or after they expire to provide additional life. The updating may occur by replacing the title materials with new ones, updating a title stub, or by adjusting the expiration information in a title resolver or state server. A user may obtain new title materials using a title update protocol or by invoking a right to update.

In another aspect, the present invention provides a title-enabled network as defined above. In one embodiment of the title-enabled network, the use of network services, and even the use of the network itself, can be specified or enabled using rights described within one or more title materials. Those having ordinary skill in the art will understand that the title-enabled network of the invention solves a variety of problems experienced by network providers today including the inability to effectively limit a user's use of their network and provide differentiated service(s), for example, in the form of higher or lower available bandwidth without expensive endpoint provisioning or requiring a user to pass authentication materials over the various portions of the network and to translate them for each type of network device.

6.1.1 Provisioning of Services

In one example, a user can access a network-accessible service that provides content, such as a streaming movie. This service can be hosted any place in the world, and is effectively limited only by the bandwidth of the slowest link in the network that the network traffic traverses between the user and the service host. In the example of a movie, it is recognized that in order to view the movie satisfactorily, a user requires a 1 Mb/second link and a quality of service maximum delay of not more than 400 ms between the client and server. Users purchase rights for both the movie content and the network provisioned to make the movie accessible at a satisfactory quality of service. These rights are represented, in this example, as two separate rights embodied within one title object or set of title materials. As will be understood, these rights may relate to different network layers. The rights also could be represented as two or more independent sets of title materials.

In this example, the user provides at least one instance of the title materials expressing at least one right that is used by an aspect of a network to configure and provision user services in accordance with the right specified by the title materials. The one or more instances of the title materials provided by the user are used by various aspects of the network to provision the network and provide the desired content. For clarity, the examples presume that the user has a single instance of the title materials (e.g., a title object) that expresses both rights, but they may actually have a plurality of independent title materials provided from one or more sources.

As the user connects to a network in order to form a connection to watch the streaming movie, they provide title materials representing rights for the movie and network provisioning. At least one aspect of the network recognizes the title materials as representing network provisioning rights, and provides network services consistent with those specified by the rights to the user. In one particular embodiment, the user provides the network title materials by providing the title materials in at least one network packet sent from the user to the streaming movie provider. In alternative embodiments, the user provides the network title materials by providing the title materials to the network as part of one or more packets communicated directly with the network. In still another alternate embodiment, the user provides title materials to the streaming movie provider, and the streaming movie provider provides the network title materials that may be used to provision the network for the user. Each of these embodiments operates similarly.

Packets transmitted over a network connection for the user are inspected by various network components as the packets travel from the user to the network service. Upon recognizing title materials provided in the packet, one or more network devices authenticate the title materials and provide the title-authorized level of network service to the user. In one embodiment, the identification of title materials in the packets need only be performed by edge devices where packets enter and leave a specific network. Examples of such edge devices may include gateway routers, firewalls, cable modems, and DSL modems. In this example, the network traffic is inspected at an edge device when the traffic enters a service provider's network. Upon inspection of the packet traffic, an edge device determines if title materials are present. If no title materials are present, the packet traffic is processed normally. If the packet traffic includes the necessary title materials, the title materials are extracted from the packet traffic, verified, and then the edge device can map the traffic to a specific network traffic profile or route. For example, a gateway/border router can use existing route specifications, such as existing MPLS-defined routes to route packet traffic to and from the user to a streaming movie provider. Alternatively, the gateway router can establish new routes, reroute the packets, or deny access to the network altogether based in part upon the title materials embedded in the network traffic. Those skilled in the art will recognize that the title materials do not need to be present in every packet of the network traffic, but can be placed only in a subset of the packets. In one specific embodiment, it is advantageous to present title materials in one or more of the following types of packets: IPSec, key exchange, or TCP/IP session initialization packets.

For example, title materials may comprise specific specification materials that enable a network to provide a service specified by at least one right. In a particular example, title materials may comprise a MPLS tag within a right specification. In an alternative example, title materials may comprise routing and/or quality of service parameters or other network provisioning specifications contained within a right specification. In a further alternative example, title materials comprise an MPLS tag effective for use by a portion of the network between the user and the streaming movie provider.

Other high value services such as packet traffic protection and quality of service also may be specified within title materials. In these cases, title materials may specify a right for at least an aspect of a user's packet traffic to be encrypted or otherwise protected, may further specify the method of protection to be used, and may further specify one or more destination services to which this traffic should be routed. In a particular example embodiment, title materials may be used to specify an aspect of the IPSec and/or VPN tunnel to be used to protect a user's network traffic.

Title-based services enabled by embodiments of the invention are thus advantageous to service providers by permitting them to provide differentiated services to their customers. In addition, embodiments of the invention also permit preferred traffic users, such as emergency providers and first responders, to access a wireless network and provide a quality of service that ensures their network traffic is passed without regard to other network loads. Those having ordinary skill in the art will recognize that cellular telephony carriers have provided this sort of differentiated service for voice calls, but they have been unable to extend this capability for network data traffic across networks outside their control. The present invention permits these classes of users to operate from wherever they are connected without reliance upon specialty networks and protocols.

6.1.2 Title Materials Used in the Provisioning of Networks

Title materials may be advantageously used when provisioning users and computers on a network. One common protocol for such provisioning is DHCP, although other protocols such as BOOTP and UPNP also may be used. Provisioning decisions often are used to affect the nature of services a user is entitled to. For example, a first user may be provisioned into a first logical network, while a second user may be provisioned into a second logical network. The first user may have access to a first set of network services at a first specified quality of service, and the second user may have access to a second set of network services at a second specified quality of service. The first and second users' sets of network services may be identical, may overlap, or be completely disjointed, and may require different levels of authentication or authorization in order to access them. In some embodiments, the logical networks each user is provisioned for are carried on the same physical network, but are logically separated using VLAN or other technologies. In other embodiments, the logical networks for which each user is provisioned are provided by independent network devices and communication links.

Title-enabled networks can provide differentiated service as described above based upon an aspect of one or more title materials presented by a user or a computer connected to the network. In some embodiments, title materials can be provided as part of an initial service request. In a specific example, a network-enabled computer system embeds one or more title materials into an initial network service request. Alternatively, title materials can be provided to a network device after a user is connected to the network.

FIG. 6 is a flowchart depicting the steps in using title materials to locate and receive a provisioning service. Provisioning services may include, for example, providing a network address, a digital certificate, network credentials, a PKI key, or any associated attributes in accordance with at least one right specified in title materials. Provisioning services may also include configuring one or more aspects of a network in order to provide services specified by title materials. In step 6110, a title-enabled computer on a network (e.g., a client) uses at least an aspect of one right expressed by title materials to locate a title-enabled provisioning service. The title-enabled computer optionally uses a service registry, database, or other directory service to assist in the lookup (6115) using an aspect of the title materials to look up additional materials in the service registry, database, or directory service. Once the desired title-enabled provisioning service is located, the client sends a request to the provisioning service to be provisioned. The provisioning request includes one or more title materials as part of the request (6120). Title materials may be included with a request by reference, or by embedding the title materials within a portion of the request. The title materials can be used to determine any aspect of provisioning, including the title-enabled computer's network address, access rights, level of service, and other attributes for use on the network. Alternatively, the title materials can be used to determine additional rights and services that are made available to the title-enabled computer and/or the user of the computer. The provisioning service receives the request (6130) and validates the title materials (6140), optionally sending the title materials to an external title validation mechanism such as a state server or title resolver for validation (6145). In some embodiments, the provisioning service uses a service registry, database, or other directory service to resolve one or more aspects of the provided title materials. For example, if the provided title materials include a reference to a title or right, the provisioning service uses a service registry, database, or directory service to resolve the reference and obtain a copy of the actual title or right. Alternatively, the title materials may be resolved using an external service such as a title resolver to resolve references in the title materials. The title materials may specify a title validation mechanism to use, the specification of the title validation mechanism to use may be preconfigured within the provisioning service, or the title validation mechanism to use may be specified by an external service such as a directory service, service registry, or service router. Alternatively, the provisioning service may have a title validation mechanism built into it. Upon making a decision on the validity of the title materials, the title validation mechanism returns the validation results to the provisioning service. The provisioning service receives the validation results (6150) and makes a decision (6160) to grant or deny provisioning services to the client. If access is denied, the provisioning process terminates, optionally returning the validation results to the title-enabled computer (6165). If access is granted, the provisioning service provisions or causes to be provisioned the title-enabled computer and/or user with any required provisioning materials, e.g. configures one or more services to be available to the user, makes bandwidth available for network traffic between specified endpoints on a network, assigns a network address and other networking parameters, provides a PKI key or digital certificate, network credentials, or provides other materials and services as specified by or required to fulfill the request by the title-enabled computer. In some embodiments, the provisioning process use an aspect of the title materials originally provided in order to make a provisioning decision or to determine at least one aspect of the provisioning service(s) provided. Alternatively, the provisioning process may use an aspect of the title materials originally to look up various aspects of the provisioning process in a database, registry, or by using an external service to obtain the information. An example of such an external service is a service router. The provisioning actions are effective to permit the title-enabled computer and/or user of said computer to use at least one aspect of the network on the basis of at least one right specified in the title materials (6170). The provisioning service optionally returns the validation results to the client (6180).

The above process provides a mechanism for an arbitrary provisioning service to make provisioning decisions based upon title materials presented as part of a provisioning request. The basic technology is widely applicable, to wireless access points, IP enabled cellular telephones, and other mobile devices that may benefit from its application.

In a first example embodiment, a network client provides title materials that express at least one right for a class or type of network service, or alternatively, the title materials express a specification for a class or type of network service. Examples of network service specification and network service class or type specification is provided below:

```
<networkService>
    <vendor>Verizon</vendor>
    <servicetype>ADSL1.5M</servicetype>
</networkservice>
```

The above example service identification describes Verizon's ADSL1.5M network service. This service name may be resolved by the title-enabled network device to a service specification, and may be further resolved to specific network device parameters and settings. Alternative service specifications may be provided; for example: "City of Cupertino Municipal," "AOL," "Skype-Business," would name a specific service name for providing service to municipal workers of the city of Cupertino, AOL subscribers, and Skype business subscribers respectively. Each of these service types or classes are associated with one or more service specifications or network configurations that can be used by a title-enabled network device to process network traffic on behalf of a user or network client.

Resolution of service identifications may take place within a title-enabled network device, or by using an external service such as a service router, a directory service, or a database. Alternatively, an internal table or list of service identifications can be stored in a title-enabled network device and used for this purpose.

In some embodiments, title materials may specify a network service specification rather than a service class or type name. A network service specification describes one or more specifications for network service that may be used by a title-enabled network device to configure at least an aspect of the network service provided to a user or network client.

```
<networkService>
    <serviceSpec>
        <uploadSpeed>1.5M</uploadSpeed>
        <downloadSpeed>7.5M</downloadSpeed>
        <maxLatency>100ms</maxLatency>
    </serviceSpec>
</networkService>
```

The above example describes a service specification for an asynchronous link of 1.5 Mbps of network throughput for upload packet traffic (from client to destination), and a 7.5 Mbps of network throughput for download packet traffic (from destination to client), and a maximum latency of 100 ms for end-to-end traffic. Such a specification could be advantageously used to configure a user or network client to receive high quality streaming video service. A title-enabled network device, upon receiving such a network service specification, resolves the specification to specific configuration information and uses that configuration information to process network traffic on behalf of a user or network client. Again, resolution of the service specification to specific configuration parameters can occur internally or by using an external service or directory as described above.

In yet another example embodiment, title materials may include pre-configured network specifications such as a MPLS tag or other specific network configuration materials. For example:

```
<networkSerivce>
    <serviceConfiguration>
        <DNS>10.1.1.1</DNS>
        <DHCPPool>10.2.0.0</DHCPPool>
        <MPLS>0x014d</MPLS>
    </serviceConfiguration>
</networkService>
```

The above example shows a description of a specific network service configuration that may be used by title-enabled network devices when included in one or more title materials. The above example first specifies a DNS service configuration parameter to use, as expressed in a dotted IP notation. Alternatively, the parameter could specify a URI or URL for a service, and may additionally provide options to the URI or URL. In addition, the above example specifies that a DHCPPool of 10.2.0.0 should be used. A DHCP pool specification may be used to specify specific access restricted addresses or alternatively specify the DHCP pool a title-enabled DHCP service should use when servicing a DHCP request. Lastly, the above example specifies a MPLS tag of 0x14d. When used in this way, the MPLS tag could be used by title-enabled network devices to further process packet traffic on behalf of the user or network client. Typically, such a MPLS tag is preconfigured by a network provider and is referenced by title materials.

Each of these methods of specifying network services may be extended in a wide variety of ways by those skilled in the art without departing from the scope of the invention. Specific title materials can use any of the described methods together or separately when specifying types of network services a title holder is entitled to receive.

6.2 Title Materials in Protocols 6.2.1 General

According to various embodiments, title materials may be embedded within network protocols to effect the presentation of the title materials at one or more network devices and their subsequent use within the network device to provide authentication, authorization, or to enable or configure each network device to provide levels of service consistent with rights represented by the title materials. Most network devices operate on standardized protocols, and may not act properly when they receive network traffic in a non-standard protocol or using a protocol that does not conform to the standard. Accordingly, it is advantageous to embed title materials within existing network protocols so that title-enabled devices can recognize and process them if they are present.

An example of a technique of embedding title materials into network traffic packets is explained using IPv6, but may also be used with IPSec and related IPv4 protocols, as well as other protocols that provide an extensible payload definition. IPv6 was selected for this example for illustrative purposes.

6.2.2 Title Materials Embedded in IPv6

In one embodiment, title materials may be embedded within a low level networking protocol such as IP. In one specific embodiment, title materials may be embedded in the low level protocol of IPv6. For example, title materials may be embedded within a destination options header of an IPv6 packet. Alternative headers, such as the routing header, also may be used. Within the destination options header, which encapsulates application protocol information, title materials can be embedded so that they are part of an IPv6 packet and are transported as part of the packet between computers and network devices. An IPv6 packet having title materials embedded in this way will be carried by all IPv6 compatible network devices without alteration. Those network devices that are title-aware can inspect network traffic for, and act upon, any title materials embedded within the packet traffic.

According to specific embodiments, title materials can be embedded within an IPv6 packet in a number of ways. One approach is to embed the title materials using a customized IPv6 protocol stack (e.g., in the network stack), so that the IPv6 processing occurs at the lowest possible level within the stack.

Within a network session, the first packet, a subset of the packets, or all packets in a session can carry embedded title materials. A network device can use title materials in the first packet to facilitate the authorization and authentication functions, and this authorization and authentication may persist for the duration of the session. In some alternate embodiments, it is not desirable to permit an authorization and authentication to persist for an entire session of indeterminate length. In these cases, title materials may be communicated using a subset of the packets in the session, and any required reauthorization can occur within the network device on an as-needed basis.

FIG. 7 is a flowchart illustrating a process of embedding title materials into an IPv6 optional header, and then transmitting the packet containing such a header to a receiving service or device where the embedded title materials are unpacked and used by the receiving service or device. Again, this example uses a destination options header, although other optional headers may be used. The network stack, while creating an IPv6 packet, receives a payload from the application, encapsulates that payload within a TCP payload frame, adds any required IPv6 headers to the packet, and adds a destination options header containing title materials information into the IPv6 packet (7110). The destination options header containing title materials information may contain title materials, or one or more references to title materials. The packet with the title materials embedded in its destination options header is forwarded down the network stack, where the low level networking (e.g., level 2) protocol portions of the packet are added to the packet. The packet is then sent to a network device (7120) over a network. The network device also has a network stack, which receives the packet from the network, processes the packet and identifies the title materials, removes the title materials from the IPv6 packet (7130), reads them (7140), optionally validates them (7145) using one or more of the well-known title material validation methods, and makes at least one decision about what to do with the packet based on the title materials (7150). The decision on how the packet should be processed can be made using the title materials, on the basis of the title materials, or by using the title materials to look up the handling in a table, database, directory, or external service.

FIG. 8 illustrates the use of embedded title materials within an optional header IPv6 protocol packet. The figure illustrates an IPV6 packet (8160) that contains a standard IPv6 header (8162), an optional security header (8166), and an optional destination options header (8164). Embedding title materials within an IPv6 destination options header causes the title materials to be carried along with rest of the packet and presented to a network device via its network interface and network stack. A title-enabled network device (8155) inspects an IPv6 packet containing embedded title materials, and makes authorization, provisioning, and other decisions related to the functioning of the network based upon at least one aspect of the presented title materials. In some embodiments, the title-enabled network device resolves the presented title materials and uses the resolved materials to make authorization, provisioning, and other decisions. Returning to the example depicted in FIG. 8, particular title materials (not shown) in the destination options header of an IPv6 packet (8164) specify that the packet should receive priority routing through the network core. This type of priority routing may be specified to support, for example, a contracted quality of service. The title-enabled network device (8155), in this example a border router of network 8100, examines the packet (8160), optionally removes the destination options header (8164), reads the contents (the title materials), and adds an MPLS header and tag (8168) to route the packet according to the instructions in the title materials (in this case, through core routers 8150 and 8130 to border router 8135, where the packet is forwarded to its destination client or service (8139).

In other, embodiments, title-enabled network devices or processes may add or change the title materials contained within an IPv6 packet prior to forwarding the packet to its destination client or service. The added or changed title materials may include replacements to all or part of the title materials, including adding additional title materials to the packet, removing title materials from the packet, or altering the title materials in the packet in some way. In particular embodiments, a title may require a changed "stub" once it has been validated. In such embodiments, the title-enabled network device makes the necessary changes in title materials embedded in the IPv6 packet prior to forwarding the packet.

6.2.3 DHCP

According to some embodiments of the present invention, title materials can be used in to determine the type of DHCP attributes, for example, address, subnet, gateway router, and other network attributes (and associated level of service) a user is entitled to. This title materials information may be embedded within DHCP messages, e.g., in the options field of one or more DHCP messages in accordance with aspects of the DHCP protocol as described herein. The message then may be sent to a DHCP server according to any of the embodiments listed below.

A title-enabled DHCP service can identify one or more title materials contained within the broadcast transmission that grants the transmitting system rights to access at least part of the network, and provide a DHCP response comprising network provisioning information such as IP address, network masks, addresses of specific network services, and the like that are effective to provide the transmitting system a network connection comprising access to a network and network services consistent with the rights described in the initial title materials. Alternatively, the title-enabled DHCP service cannot provide a response, or provides a response that effectively limits the access of the user to specific network resources, on the basis of provided title materials. An example of a limiting response might be to provide an IP address that can connect to basic resources, but cannot use external network services. Alternatively, the limiting response can provide access solely to a DMZ or other limited area of the network.

In another alternative embodiment, the DHCP-response from a title-enabled DHCP server can provide additional parameters to be used by the user when sending their network traffic. For example, a title-enabled DHCP server can use provided title materials to select and provide one or more additional title materials, network access tokens, digital certificates, or other materials, such as a MPLS tag, that can be subsequently used by a user or their computer to gain access or services from a network. The user's computer would typically include this information in message traffic (such as by embedding it within a protocol) sent by the user to ensure its appropriate handling by other portions of the network.

In yet another example embodiment, a DHCPDISCOVERY broadcast also may include title materials in its options field, and a title-enabled DHCP service may choose to respond to the DHCPDISCOVERY broadcast on the basis of the embedded title materials.

FIG. 9 depicts a schematic of a network architecture comprising a title-enabled DHCP service operably connected with a title resolver (or other title validation mechanism) that is effective for verification of presented title materials. A title-enabled network client (e.g. a computer running a title-enabled DHCP client) (9110*a/b/c*) connects to a network, which may include at least one router, switch, hub, wireless access point, or other network devices (9120) that interface the client to a title-enabled DHCP service (9130). A title-enabled DHCP service may be operably connected to an external network (9150) such as an enterprise network, a metropolitan network, or the Internet. A title-enabled DHCP service may also be operably connected to at least one title verification mechanism (9140) such as a title resolver or state server, and optionally may use a database or directory of network parameters associated with specific title materials (9135). The title verification and database of parameters may be integrated within the title-enabled DHCP service, or may be configured as external services. The title-enabled DHCP service is hosted on a computer, such as a network server, or is alternatively hosted on a network device.

FIG. 10 depicts the processing steps of an example implementation of a title-aware DHCP server. A title-enabled network client may use a DHCPDISCOVERY broadcast to locate a particular DHCP server, or may broadcast a request for service. If a DHCPDISCOVERY broadcast is used, a title-enabled network client can embed title materials in the DHCPDISCOVERY request to ensure that a title-enabled DHCP server responds to the request. A title-enabled DHCP server, upon receiving a DHCPDISCOVERY request, processes it using the same techniques as described below for a DHCPREQUEST packet.

Once an appropriate title-enabled DHCP server is located, a title-enabled network client sends a specially constructed DHCPREQUEST packet to the title-enabled DHCP server (10110). This request packet embeds one or more title materials within the DHCPREQUEST packet. Preferably, the title materials are embedded within an extensible field of the DHCPREQUEST packet such as the options area. The title-enabled DHCP service receives the specially constructed DHCPREQUEST packet (10120) from the network for processing.

Upon receipt of a DHCP packet, the title-enabled DHCP server processes the packet. During this processing, the title-enabled DHCP service recognizes title materials in the options area of a DHCP packet, either by using a defined option value, or by inspection of the option contents (10130). The identification of title materials typically occurs in a title-enabled DHCP service when it processes the DHCP packet. A title-enabled DHCP service then further processes the title materials contained in the DHCP packet. The processing may take the form of executing or invoking a right represented by the title materials, or it may be to inspect the rights represented by the title materials and make determinations based upon information contained in the title materials. In either case, a title-enabled DHCP service identifies embedded title materials as described above, and processes the title materials as described below. If no title materials are identified in the packet, the title-enabled DHCP server processes the DHCP request in a manner consistent with a non-title-enabled DHCP server.

When presented with title materials, the DHCP service validates the title materials (10140) using a title resolver or another title verification mechanism such as a state server. In some embodiments, a title-enabled DHCP service uses the presented title materials with a service router, database, directory service, or title resolver and uses the resulting materials to make the authorization, provisioning, and other decisions. A title resolver, state server, or other title verification mechanism can be included within a title-enabled DHCP service, or one may be operably connected to the title-enabled DHCP server over a network. An example of a title resolver/state server processing was described above. If the title materials are determined to be valid (10145), the title-enabled DHCP service then determines the rights requested by the client, and further determines the network parameters required to provide network services in accordance with a right expressed in the presented title materials (10150). If the title materials are not valid, the title-enabled DHCP service may refuse service to the network client (as shown by the No branch from decision 10145), or may alternatively process the DHCP request as if title materials were not present.

Once one or more valid title materials have been identified, a title-enabled DHCP server may process those title materials in a manner consistent with the type of title materials identified by the title-enabled DHCP server. In one embodiment, the title materials can be sent to a digital commerce engine or DCE (not shown) for further processing and the resulting title materials may be used to provision the network. In a second embodiment, the title-enabled DHCP service invokes one or more rights specified by the received title materials. Thus, for example, a title-enabled DHCP service may recognize a specific right for high speed networking in the title materials and invoke that right. The invocation of the right may be performed by the title-enabled DHCP service or by other title-enabled components. Furthermore, the right may be processed by the title-enabled DHCP service. In some embodiments, a title-enabled DHCP service recognizes one or more rights, invokes them, and then provides services that fulfill the invoked rights.

In another embodiment, the title-enabled DHCP service uses one or more aspects of the received title materials to provision the client. In yet another embodiment, the title-enabled DHCP service uses one or more aspects of the received title materials to access a service or database to determine the network parameters and/or provisioning specifications to use for a specific client. In this embodiment, a title-enabled DHCP service has an optional associated database of or service that provides (e.g. database 9135 as shown in FIG. 9) network parameters and/or provisioning specifications, including addresses, netmasks, available services, etc., that the title-enabled DHCP service may use to provide a response to a client. In some particular embodiments, a title-enabled DHCP service may have available to it a database of rights and their respective provisioning settings. Alternatively, a title-enabled DHCP service may use an aspect of at least one right to conduct a database search to determine the response values, or may simply use a part of the provided title materials as the response values.

The DHCP service then packages up the response values (e.g., network parameters) specified (by whatever mechanism) and returns them to the client (10160), which uses them to establish a network connection that provides the client with access to the network based on at least an aspect of the title materials. In some particular embodiments, the response values may comprise new, additional, or changed title materials in the response packet options area. The client may use these title materials from the response packet in various ways, e.g., for authorization and access management, to construct network traffic, or to update existing titles stored at the client.

DHCP as used above is a non-limiting example of a title-enabled network service that provides users with access based upon at least one set of title materials. A reader skilled in the art will understand how the techniques described herein can be extended to other network technologies, including mobile (cellular) networks operating on GSM, CDSA, iDEN, or other cellular technologies, and wireless network technologies such as the various versions of 802.11 (e.g. a, b, g, n) and WiMax.

6.2.4 Title Materials Embedded in Other Protocols

Title materials may be advantageously embedded in other generic network protocols, including XML-based protocols such as SOAP and XML-RPC, and within generic application protocols such as HTTP and FTP. Unlike existing title-based service protocols, use of generic protocols to transport titles and title materials provides additional opportunities to provide title-enabled architectures using existing infrastructure.

Although seen primarily as a means to fetch pages of Hypertext Markup Language (HTML) content for display in a web browser, HTTP is really a general-purpose transport for any type of data.

HTTP may be advantageously used to encode title and right references within, for example, URIs. One mechanism for encoding title references within a URI is to encode a title or right reference in the same manner as a DOI or document ID. For example, a title reference in a service registry might be encoded as:

http://myserviceregistry.com/index.html?titleID=a080847000001001b3eb63400000091

The GET and POST operations within HTTP provide a generic mechanism within which to embed title materials for transport. HTTP further permits the use of title-material specific content type and subtype (e.g. X-Navio-Title/XNavio-TitleMaterials) during the transmission of title materials using HTTP's GET and POST operations. The encoding of materials within GET and POST operations is well understood by those skilled in the art.

Modern service-based architectures rely on RPC-based architectures based upon XML-RPC or the Simple Object Access Protocol (SOAP). XML-RPC is a remote procedure call protocol which uses XML to encode its calls and HTTP as a transport mechanism. SOAP is a standards-based implementation of XML-RPC technologies.

Both XML-RPC and SOAP provide mechanisms for users to embed title materials within a remote procedure call request or response by adding the title materials to the XML structures comprising the request or response. Adding title materials to an XML structure should be well understood by those skilled in the art.

Both XML-RPC and SOAP may be transported using application protocols such as HTTP. The use of HTTP and other application protocols is advantageous in that it permits network traffic to transit firewalls with minimal configuration. In addition to transmitting XML-RPC or SOAP materials (that may contain title materials), HTTP and other application protocols may be used to transmit title materials independently using the same techniques. Thus, a user may send title materials to a network service by embedding the title materials into HTTP or another application protocols using the well understood techniques used to embed XML-RPC and SOAP within these protocols.

In some embodiments, the response messages for protocols such as XML-RPC and SOAP may further comprise additional or changed title materials for use by the client. The client may use these title materials from the response packet in various ways, e.g. for authorization and access management, to construct network traffic, or to update existing titles stored at the client.

6.3 Title-Enabled Network Devices

A network device described above, such as the gateway/border router or cable modem described above can operate upon title materials in a variety of ways. A title-enabled network device is capable of reading title materials encoded in IP packets, such as the destinations option header of an IPv6 packet, or the options field of a DHCP message. Alternatively, title materials can be presented as part of the authorization and authentication interchange conducted when a network client communicating with a network device. Once title materials are received by a title-enabled network device, an association then can be formed between the title materials and a source IP address, by using the source IP address, MAC address, or other networking attributes of the network client. In some embodiments, the network device can provide a service interface to which a user or network client can connect. For example, current technology network devices such as routers, switches, and broadband modems often provide a web-based interface for configuring the network device. Alternatively, the service interface provided by a network device can be a protocol-based service such as telnet or SOAP, or any other well-known protocol-based service. In additional alternative embodiments, title materials may be presented to a title-enabled network device using a presentation protocol such as HTTP as described above. Network devices able to recognize at least one aspect of title materials and configure their operation in accordance with at least one aspect of the title materials are said to be title-enabled.

In each of the embodiments described below, the network device is provided with title materials. The title materials are then validated, either in real-time, or in embodiments where response time is of the essence, after the fact. In some embodiments, the validation materials can be cached at the network device and validation can occur without additional network activity. Validation of title materials makes the aspects of the rights described therein available for use.

Once a title-enabled network device identifies and validates title materials from a network client, a network device may take one or more actions. First, it may use aspects of the identified title materials to configure itself or other network devices to provide network services in accordance with the identified title materials. Second, it may invoke one or more rights expressed by the title materials, and use the process of invoking the rights to configure itself or other network devices to provide network services in accordance with the identified title materials. Third, it may use the materials returned from the invocation of one or more rights to configure itself or other network devices to provide network services in accordance with the returned materials from the rights invocation. Fourth, it may use aspects of the identified title materials to look up and return network configuration materials or title materials to a network client.

Figure 11:
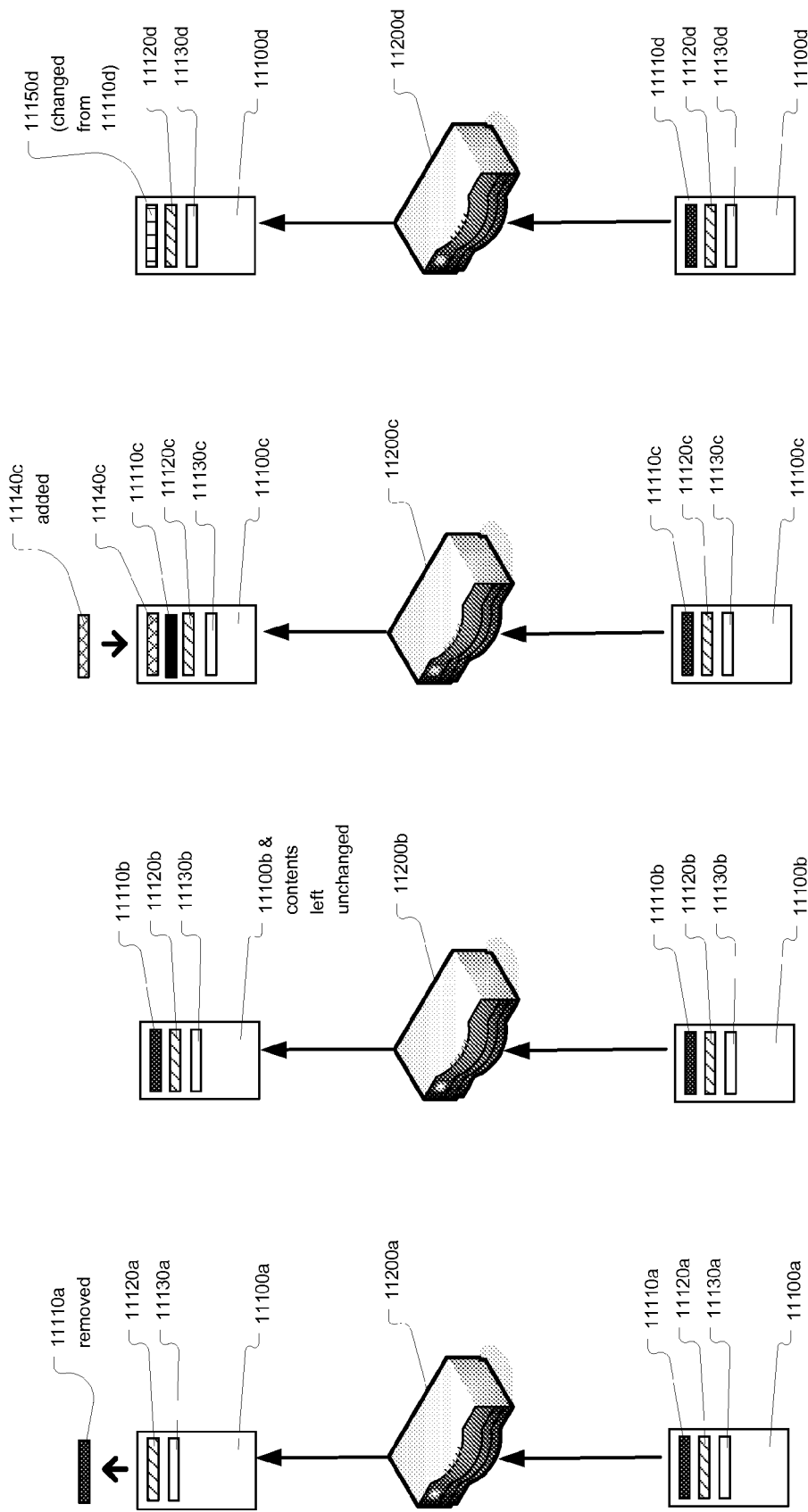

Furthermore, each network device receiving title materials embedded in a network protocol where the network device is expected to forward the received packets to another network device or end destination, may take one or more of the following actions, as depicted in FIGS. 11A-11D. FIG. 11A illustrates the title materials being processed by a network device (11200*a*) that removes the title materials (11110*a*) from the packet traffic (11100*a*) prior to forwarding the packet traffic. FIG. 11B illustrates the title materials being processed by a network device (11200*b*) where the network device forwards the packet traffic, including the title materials (11100*b*) without alternation. FIG. 11C illustrates the title materials being processed by a network device (11200*c*) where the network device adds removes, or changes at least one part of the packet traffic (11100*c*) to indicate that the title materials were processed. In the example shown in the figure, the network device has made an addition (11140*c*) to the packet traffic, such as an MPLS tag. FIG. 11D illustrates the title materials being processed by a network device (11200*d*) to add, remove, or change an aspect of the title materials (11110*d*) in accordance with the results of processing said title materials. As shown in FIG. 11D, an aspect of the title materials (11110*d*) has been changed and the changed materials placed in the packet (11150*d*).

6.3.1 Title-Enabled Router

A title-enabled router is a specific embodiment of a title-enabled network device that can provide network services in accordance with at least one aspect of title materials provided to it. Title-enabled routers provide unique services in that they process all network traffic and may be used to provide rights-specified networking services. There are several ways that a router can detect and act upon title materials. For example, a title-enabled router can inspect a destination options header or other optional headers of one or more packets. In particular, a router can inspect an IPv6 packet for a destination option header or other optional header, and if one is found, inspect that header for title materials. In an alternate embodiment, a title-enabled router can detect title materials based on content inspection of a packet being processed by the title-enabled router. For protocols that do not support embedded title materials, a title-enabled router can make routing decisions and assignments based on an aspect of a network configuration parameter, such as a MPLS header, a source IP, or other networking option used by the source network client. In some embodiments, the network configuration parameter recognized by a title-enabled router is one assigned to a network client by a title-enabled DHCP service as described above.

FIG. 12 depicts an example of an architecture in which a title-enabled router (12120) is operably connected with one or more network clients (12110*a/b/c*), a title verification mechanism (such as a title resolver or other mechanisms) for title verification (12130), and a network (12140) comprising a network destination for traffic routed by the title-enabled router.

FIG. 13 is a flowchart depicting the steps in routing a network packet using a title-enabled router. In step 13110, the network client includes title materials in a network packet being sent to another location on the network. Optionally, the network client provides the title materials to the title-enabled router using out of band mechanisms prior to sending network packet traffic. The title-enabled router inspects a packet (13120) and validates the title materials (13130) the first time they are seen. If the title materials are valid (13140), the process continues to the next step. If the title materials are not valid, the process terminates and the packet is either not routed or routed in accordance with the routing steps used for non-title-enabled network traffic. If the title materials specify rights that map to a specific routing, traffic shaping, or quality of service profile, the title-enabled router then processes the title materials accordingly (13150). The processing of the title materials may involve any of the steps described above for how a network device processes title materials. According to a specific embodiment, the title-enabled router uses the title materials or other aspects of the network traffic (packets) to insert a MPLS header tag in one or more packets. Preferably, this assignment is based, at least in part, upon an aspect of the presented title materials (13160). The router then routes the packet(s) based on the MPLS tag (13170).

In a particular embodiment, a right expressed by title materials can describe a preferential network service routing enabled by a MPLS tag supported by the router. The MPLS tag can be contained within the title materials itself, or can be content referenced by the title materials. Continuing with the example, the validation of the title materials makes the title-represented right of "create connection" available. Other title-enabled rights also may enable specific types, classes, or performance levels of network connections. The "create connection" right names a service that creates a connection, and parameterizes this service with the MPLS tag to use with traffic associated with the connection. When a user or network client requests a connection be created, the network device calls the service identified by the title materials and passes the MPLS tag to that service. The service then sets up the connection for the user or network client, and returns the MPLS tag to the user's IP stack for embedding in the protocol packets. Alternatively, the service can configure the router to tag all traffic from the user or network client using the named MPLS tag and to route that traffic in accordance with the defined network tag. Alternatively, the router can create a MPLS tag and use that tag as described above.

FIG. 14 depicts an example of title-enabled routing using MPLS headers. This example is similar to the MPLS routing example provided above, where there an "EDGE" routing policy is facilitated. A network client (14157) inserts title materials (14162) into a data packet (14160). The packet is presented to a border router (14155), which examines (14170) the packet, locates the title materials, and based upon an aspect of the title materials, associates the packet with a MPLS header and label (14162). The packet is then routed by the router in accordance with the MPLS label (14168). In the example flow shown in FIG. 14, a packet has its final destination in a different network and is routed around the edge of both networks (from 14155 to 14115 to 14125 to 14245 to 14235). At the exit router (14235), the MPLS header is removed and the payload (packet) is delivered to its destination (14237). In some embodiments, the exit router further inspects the network packets after the MPLS header is removed and uses the title materials contained in these packets to configure the exit router to properly handle response traffic. This enables bi-directional message handling in accordance with aspects of the title materials without the destination having to embed title materials in its response traffic. This permits title-enabled networking to non-title-enabled systems and services.

6.3.2 Title-Enabled Wireless Access Point

According to specific embodiments, a title-enabled wireless access point is an 802.11a, 802.11b/g, or wireless mesh device capable of reading title materials held by a user on their network device (such as a laptop, Palm Pilot, etc.). The user's title materials are presented by the network client when the client requests a DHCP address from the wireless network. This request is routed using the appropriate 802.11 wireless protocol. The title-enabled wireless access point makes a decision from the request packet on how to route the request. Alternatively, the title-enabled wireless access point routes all packets to another network device, such as a title-enabled router, described above. The title materials instruct a DHCP server on the wireless network to provide the user with an IP address and level of service commensurate with the title materials presented.

A title-enabled wireless access point can be coupled with DHCP (as described above) to provide a suitable IP address for any given client. For example, one client may present title materials that entitle them to high bandwith service, while another receives a dedicated pipeline to a partner network "walled garden," and a third who doesn't have title materials is presented with the network's credit card server in order to buy "pay as you go" time on the network.

The title-enabled wireless access point can handle multiple addresses from different address networks to effectively manage the network traffic. This routing capability is present in most wireless access points today.

A title-enabled wireless access point reduces the complexity of networks that support a plurality of classes of users, each of which receives differentiated service levels. In conventional networks, each class of user is provisioned with a unique SSID. Users connect to the desired SSID to receive each level of differentiated service. Metropolitan and campus networks must provide wireless access points that support a plurality of SSIDs, or must provide a plurality of wireless access points, each providing a different SSID. Examples of these types of networks include campus and metropolitan networks, Use of title-enabled wireless access points permit the reduction in complexity and number of wireless access points because they permit all users to connect to a specific SSID instead of requiring different SSIDs for each class of user. This reduces the number of devices, and the complexity of devices, effectively reducing the deployment cost of the network.

6.4 Title-Enabled Network

A particular problem that embodiments of the present invention alleviates is the differentiated use of network bandwidth based upon rights. Today, network providers such as BitTorrent suffer performance degradation resulting from too many users downloading large pieces of content in a given period, effectively using all of the available bandwidth and preventing some users from attaining acceptable throughput. Network providers must therefore design to their maximum "surge" requirement based upon all users who can request access at a specific time. Using the software, systems, and methods provided by the invention, a class of differentiated (e.g., premium and limited) network bandwidth users can be established having access to either higher or lower available bandwidth based in part upon information provided when the user connects to the network. Unlike the point-of-presence connection to the network described above, the differentiated service spans an entire network, and can span a plurality of networks provided by more than one network provider.

While the invention has been particularly shown and described with reference to specific embodiments thereof, it will be understood by those skilled in the art that changes in the form and details of the disclosed embodiments may be made without departing from the spirit or scope of the invention. For example, reference has been made herein to various types of computing platforms, network configurations, protocols, and processes which may be employed to implement various aspects of specific embodiments of the invention. It will be understood that such reference should not be used to narrow the scope of the invention. Rather, such references will be understood to be made by way of example, and it will be further understood that any of a wide variety of computing platforms, network configurations, protocols, processes, computing models, and the like, may be employed to implement embodiments of the invention without departing from the scope of the invention. For example, embodiments of the invention are not limited to specific types of computing platforms or network devices referred to herein. To the contrary, virtually any type of computing device having at least one interface for receiving or transmitting data (e.g., packets, frames, etc.), and at least one processor (e.g., CPU, processing cores, processor clusters, etc.) to facilitate processing of such data may be employed to implement various aspects of the invention as will be apparent to those of skill in the art.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for processing packets in a network according to a packet processing protocol, a first subset of the packets being included in a first session, and a second subset of the packets being included in a second session, the method comprising:

receiving a first one of the packets included in the first session with a network device operating in the network, the first packet having a header configured as specified by the packet processing protocol, the header including title materials comprising one or more of a title object, a component of the title object, or a reference to the title object, the title object comprising a digital bearer instrument representing at least one right relating to processing of the first packet in the network in accordance with the packet processing protocol which may be redeemed by presentation of the title object to a title-enabled device or process operating in the network;

extracting, by the network device, at least some of the title materials from the header of the first packet;

validating the title object in one or more title validation steps in addition to the packet processing protocol, validation of the title object including computing a first value using indicia included in the title object, and comparing the first value to a second value stored separately from the title object;

upon validation of the title object based on the first and second values matching, processing the first packet with the network device in accordance with the packet processing protocol and the at least one right represented by the title object;

updating the second value and the indicia in the title object;

based on the validation of the title object associated with the first packet and without requiring processing of additional title materials, processing others of the packets of the first session in accordance with the packet processing protocol and the at least one right represented by the title object;

receiving the packets of the second session with the network device, each of the packets of the second session having a header configured as specified by the packet processing protocol;

determining that no title materials are associated with the packets of the second session; and processing the packets of the second session in accordance with the packet processing protocol;

wherein the processing of the packets of the first session corresponds to a differentiated level of service relative to the processing of the packets of the second session, the differentiated level of service being enabled by the title object.

2. The method of claim 1 wherein processing the first packet comprises one or more of dynamically provisioning an aspect of the network, or mapping the first packet onto a previously provisioned aspect of the network.

3. The method of claim 2 wherein the aspect of the network comprises one or more of an end user device, a server, a modem, a router, a switch, a network appliance, a point-of-presence device, a wireless access point, a gateway, a firewall, a process, or a network service.

4. The method of claim 1 wherein the at least one right represented by the title object relates to one or more of network access, quality of service, level of service, packet traffic protection, traffic class, or traffic priority.

5. The method of claim 1 wherein the packet processing protocol comprises one or more of MPLS, DHCP, BOOTP, IPv4, IPv6, TCP/IP, UDP/IP, DNS, GSM, CDSA, iDEN, 802.11a, 802.11b, 802.11g, 802.11i, 802.11n, WiMax, uPNP, telnet, FTP, SMTP, POP, IMAP, HTTP, SOAP, XML-RPC, and SMS.

6. The method of claim 1 wherein processing the first packet comprises one of replacing, altering, adding to, or removing at least a portion of the title materials.

7. The method of claim 1 further comprising transmitting a response packet to a recipient via the network, the response packet including additional title materials comprising one or more of an additional title object, a component of the additional title object, or a reference to the additional title object, the additional title object comprising an additional digital bearer instrument representing at least one additional right relating to the network which may be redeemed by presentation of the additional title object to a title-enabled process operating in the network.

8. The method of claim 1 wherein the title materials are included in one or a subset of the packets.

9. The method of claim 1 wherein the receiving of the first packet and the validation of the title object are respectively performed by a single device or a single process.

10. The method of claim 1 wherein the receiving of the first packet and the validation of the title object are respectively performed by separate devices or processes.

11. The method of claim 1 wherein the at least one right represented by the title object comprises a plurality of rights, at least two of the rights relating to different network layers.

12. The method of claim 1 wherein processing the first packet comprises using the title materials to look up packet processing information in a database, directory, or registry, the packet processing information specifying how the first packet is to be processed.

13. A title-enabled network device for processing packets in a network according to a packet processing protocol, a first subset of the packets being included in a first session, and a second subset of the packets being included in a second session, the device comprising:
at least one interface configured to receive a first one of the packets included in the first session, the first packet having a header configured as specified by the packet processing protocol, the header including title materials comprising one or more of a title object, a component of the title object, or a reference to the title object, the title object comprising a digital bearer instrument representing at least one right relating to processing of the first packet in the network in accordance with the packet processing protocol which may be redeemed by presentation of the title object to a title-enabled device or process operating in the network, the at least one interface also being configured to receive the packets of the second session, each of the packets of the second session having a header configured as specified by the packet processing protocol; and
at least one processor configured to extract at least some of the title materials from the header of the first packet, validate the title object in one or more title validation steps in addition to the packet processing protocol, wherein validation of the title object includes computing a first value using indicia included in the title object, and comparing the first value to a second value stored separately from the title object, upon validation of the title object based on the first and second values matching, facilitate processing of the first packet in the network in accordance with the packet processing protocol and the at least one right represented by the title object, update the second value and the indicia in the title object, and, based on the validation of the title object associated with the first packet and without requiring processing of additional title materials, process others of the packets of the first session in accordance with the packet processing protocol and the at least one right represented by the title object, the at least one processor also being configured to determine that no title materials are associated with the packets of the second session, and to process the packets of the second session in accordance with the packet processing protocol;
wherein the processing of the packets of the first session corresponds to a differentiated level of service relative to the processing of the packets of the second session, the differentiated level of service being enabled by the title object.

14. The network device of claim 13 wherein the network device comprises one of an end user device, a server, a modem, a router, a switch, a network appliance, a point-of-presence device, a wireless access point, a gateway, or a firewall.

15. The network device of claim 13 wherein the at least one processor is configured to facilitate processing of the first packet by one or more of dynamically provisioning an aspect of the network, or mapping the first packet onto a previously provisioned aspect of the network.

16. The network device of claim 15 wherein the aspect of the network comprises one or more of the network device itself, at least one other network device, at least one process operating in the network, or at least one network service available via the network.

17. The network device of claim 13 wherein the packet processing protocol comprises one or more of MPLS, DHCP, BOOTP, IPv4, IPv6, TCP/IP, UDP/IP, DNS, GSM, CDSA, iDEN, 802.11a, 802.11b, 802.11g, 802.11i, 802.11n, WiMax, uPNP, telnet, FTP, SMTP, POP, IMAP, HTTP, SOAP, XML-RPC, and SMS.

18. The network device of claim 13 wherein the at least one processor is configured to facilitate processing of the first packet by one of replacing, altering, adding to, or removing at least a portion of the title materials.

19. The network device of claim 13 wherein the at least one processor is further configured to transmit a response packet to a recipient via the network, the response packet including additional title materials comprising one or more of an additional title object, a component of the additional title object, or a reference to the additional title object, the additional title object comprising an additional digital bearer instrument representing at least one additional right relating to the network which may be redeemed by presentation of the additional title object to a title-enabled process operating in the network.

20. The network device of claim 13 wherein the at least one processor is configured to validate the title object.

21. The network device of claim 13 wherein the at least one processor is configured to request validation of the title object from an external device or an external process.

22. The network device of claim 13 wherein the at least one processor is configured to facilitate processing of the first packet as part of an invocation process by which the at least one right represented by the title object is invoked.

23. The network device of claim 13 wherein the at least one processor is configured to use the title materials to look up packet processing information in a database, directory, or registry, the packet processing information specifying how the first packet is to be processed.

24. A title-enabled network, comprising a plurality of network devices interconnected with a plurality of links, at least one of the network devices comprising a title-enabled network device comprising at least one interface configured to receive a first packet of a plurality of packets, the packets being included in a first session, the first packet having a header configured as specified by a packet processing protocol, the header including title materials comprising one or more of a title object, a component of the title object, or a reference to the title object, the title object comprising a digital bearer instrument representing at least one right relating to processing of the first packet in the network according to the packet processing protocol which may be redeemed by presentation of the title object to a title-enabled device or process operating in the network, the at least one interface also being configured to receive another plurality of packets included in a second session, each of the packets of the second session having a header configured as specified by the packet processing protocol, the title-enabled network device further comprising at least one processor configured to extract at least some of the title materials from the header of the first packet, validate the title object in one or more title validation steps in addition to the packet processing protocol, wherein validation of the title object includes computing a first value using indicia included in the title object, and comparing the first value to a second value stored separately from the title object, upon validation of the title object based on the first and second values matching, facilitate processing of the first packet in the network in accordance with the packet processing protocol and the at least one right represented by the title object, update the second value and the indicia in the title object, and, based on the validation of the title object associated with the first packet and without requiring processing of additional title materials, process others of the packets of the first session in accordance with the packet processing protocol and the at least one right represented by the title object, the at least one processor also being configured to determine that no title materials are associated with the packets of the second session, and to process the packets of the second session in accordance with the packet processing protocol;

wherein the processing of the packets of the first session corresponds to a differentiated level of service relative to the processing of the packets of the second session, the differentiated level of service being enabled by the title object.

25. The network of claim 24 wherein the plurality of network devices includes at least one title validation device configured to facilitate validation of the title object.

26. The network of claim 24 wherein the plurality of network devices comprises one or more edge devices defining an edge of the network, and one or more core devices within the edge of the network, and wherein the at least one of the network devices which comprises the title-enabled network device comprises the one or more edge devices.

27. The network of claim 24 wherein the title-enabled network device is configured to facilitate processing of the first packet by facilitating one or more of dynamically provisioning an aspect of the network, or mapping the first packet onto a previously provisioned aspect of the network.

28. The network of claim 27 wherein the aspect of the network comprises one or more of an end user device, a server, a modem, a router, a switch, a network appliance, a point-of-presence device, a wireless access point, a gateway, a firewall, a process, or a network service.

29. The network of claim 24 wherein the at least one right represented by the title object relates to one or more of network access, quality of service, level of service, packet traffic protection, traffic class, or traffic priority.

30. The network of claim 24 wherein the packet processing protocol comprises one or more of MPLS, DHCP, BOOTP, IPv4, IPv6, TCP/IP, UDP/IP, DNS, GSM, CDSA, iDEN, 802.11a, 802.11b, 802.11g, 802.11i, 802.11n, WiMax, uPNP, telnet, FTP, SMTP, POP, IMAP, HTTP, SOAP, XML-RPC, and SMS.

31. The network of claim 24 wherein the title-enabled network device is configured to use the title materials to look up packet processing information in a database, directory, or registry, the packet processing information specifying how the first packet is to be processed.

* * * * *